(12) United States Patent
Liu

(10) Patent No.: US 12,255,763 B2
(45) Date of Patent: Mar. 18, 2025

(54) REFERENCE SIGNAL SEQUENCE MAPPING AND DE-MAPPING METHODS, AND APPARATUS

(71) Applicant: HUAWEI TECHNOLOGIES CO., LTD., Shenzhen (CN)

(72) Inventor: Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/727,132

(22) Filed: Apr. 22, 2022

(65) Prior Publication Data

US 2022/0247613 A1 Aug. 4, 2022

Related U.S. Application Data

(63) Continuation of application No. PCT/CN2020/120020, filed on Oct. 9, 2020.

(30) Foreign Application Priority Data

Oct. 31, 2019 (CN) .......................... 201911062855.6

(51) Int. Cl.
*H04L 12/00* (2006.01)
*H04L 5/00* (2006.01)
*H04L 27/26* (2006.01)

(52) U.S. Cl.
CPC ...... *H04L 27/26134* (2021.01); *H04L 5/0048* (2013.01)

(58) Field of Classification Search
CPC ..... H04L 27/26; H04L 5/0048; H04L 1/0643; H04L 27/2636; H04L 27/2613; H04L 27/261

(Continued)

(56) References Cited

U.S. PATENT DOCUMENTS 10,404,509 B2 9/2019 Sun et al.
2018/0145854 A1 5/2018 Akkarakaran et al.

FOREIGN PATENT DOCUMENTS

CN 101800912 A * 8/2010 ............ H04J 3/1652
CN 101986631 A 3/2011

(Continued)

OTHER PUBLICATIONS

Yafei Hou et al: "Channel Estimation Improvement for MIMO Single Carrier Block Transmission System", Jun. 5, 2011, pp. 1-6, XP031908230.

(Continued)

*Primary Examiner* — Frantz Coby
(74) *Attorney, Agent, or Firm* — HAUPTMAN HAM, LLP

(57) ABSTRACT

Reference signal sequence mapping and de-mapping methods, and an apparatus are provided, to resolve a problem in a conventional technology that time-domain overheads of a reference signal of a single-carrier waveform are relatively large. In this application, a sending device maps a reference signal sequence to a modulation symbol set, to obtain a multiplexing set, where the multiplexing set occupies one single-carrier time domain symbol. Compared with a solution in which a reference signal sequence occupies one single-carrier time domain symbol, the solution in this application reduces time-domain overheads of the reference signal. In addition, to correctly perform channel estimation or channel sounding for the reference signal, different reference signal sequences meet conditions such as orthogonality or conjugate orthogonality, and locations of the reference signal sequences in different multiplexing sets further meet corresponding conditions, and so on.

20 Claims, 12 Drawing Sheets

(58) Field of Classification Search
USPC .......................................................... 370/329
See application file for complete search history.

(56) References Cited

FOREIGN PATENT DOCUMENTS

| CN | 102547990 | A | | 7/2012 | |
|---|---|---|---|---|---|
| CN | 102960038 | A | | 3/2013 | |
| CN | 104580037 | A | | 4/2015 | |
| CN | 106878228 | A | * | 6/2017 | ............. H04L 27/34 |
| CN | 107733617 | A | | 2/2018 | |
| CN | 107948113 | A | * | 4/2018 | ......... H04L 27/2614 |
| CN | 108347318 | A | | 7/2018 | |
| CN | 108390889 | A | * | 8/2018 | ......... H04L 27/2628 |
| CN | 109964430 | A | | 7/2019 | |
| CN | 110268775 | A | | 9/2019 | |
| CN | 114050888 | A | * | 2/2022 | ............... H04K 1/02 |
| CN | 115664523 | A | * | 1/2023 | ............. H04L 27/26 |
| CN | 112930656 | B | * | 7/2023 | ............. H04L 5/005 |
| EP | 998045 | A1 | * | 5/2000 | ........ H03M 13/2957 |
| EP | 3544202 | A1 | | 9/2019 | |
| JP | 2016103838 | A | | 6/2016 | |
| TW | 201246801 | A | * | 11/2012 | ........ H03M 13/1102 |
| WO | 2018175766 | A1 | | 9/2018 | |
| WO | WO-2021082881 | A1 | * | 5/2021 | ........... H04L 1/0643 |

OTHER PUBLICATIONS

11th et al: "Pre-OFT Multiplexing of RS and Data: Results on Short Duration One OFDM Symbol Uplink", 3GPP Draft; R1-1701913, Feb. 5, 2017, XP051220202, total 7 pages.
Extended European Search Report issued in corresponding European Application No. 20881772.6, dated Nov. 24, 2022, pp. 1-10.
3GPP TSG RAN WG1 #62bis meeting R1-105709,Comparison of 2-Tx transmit diversity schemes for PUCCH Format 3, Mitsubishi Electric, Xian, China, Oct. 11-15, 2010, total 6 pages.
3GPP TSG-RAN WG1 #89, R1-1707804, Transmit diversity for DFTsOFDM-based PUCCH in long duration, Mitsubishi Electric, Hangzhou, China, May 15-19, 2017, total 11 pages.
3GPP TSG RAN WGI Meeting#91, R1-1721009, Ericsson, on transmit diversity for PUCCH, Reno, U.S.A., Nov. 27-Dec. 1, 2017, total 6 pages.
European Notice of Grant issued in corresponding European Application No. 20881772.6, dated Sep. 1, 2023, pp. 1-64.
3GPP TSG-RAN1 Meeting #88 ,R1-1704156,Introduction of V2X,Ericsson,Athens, Greece, Feb. 13-17, 2017, total 14 pages.
International Search Report issued in corresponding International Application No. PCT/CN2020/120020, dated Jan. 4, 2021, pp. 1-12.
Chinese Office Action issued in corresponding Chinese Application No. 201911062855.6, dated Sep. 27, 2021, pp. 1-11.

* cited by examiner

REFERENCE SIGNAL SEQUENCE MAPPING AND DE-MAPPING METHODS, AND APPARATUS

CROSS-REFERENCE TO RELATED APPLICATIONS

This application is a continuation of International Application No. PCT/CN2020/120020, filed on Oct. 9, 2020, which claims priority to Chinese Patent Application No. 201911062855.6, filed on Oct. 31, 2019. The disclosures of the aforementioned applications are hereby incorporated in entirety by reference.

BACKGROUND

Single-carrier waveforms such as discrete Fourier transform-spread-orthogonal frequency division multiplexing (DFT-s-OFDM) or single carrier-quadrature amplitude modulation (SC-QAM) are widely used in various communication systems. Compared with a multi-carrier waveform such as orthogonal frequency division multiplexing (OFDM), a single-carrier waveform has a lower peak to average power ratio (PAPR). Therefore, with same power amplification, the single-carrier waveform provides higher output power and higher power amplification efficiency, thereby improving coverage and reducing energy consumption. For a single-carrier waveform, how to design reference signal sequence mapping and de-mapping solutions is currently a hot research topic.

SUMMARY

Embodiments of this application provide reference signal sequence mapping and de-mapping methods and an apparatus, to provide reference signal sequence mapping and de-mapping solutions for a single-carrier waveform.

According to a first aspect, a reference signal sequence mapping method is provided. The method includes: A sending device determines a first multiplexing set based on a first modulation symbol set and a first reference signal sequence; the sending device determines a second multiplexing set based on a second modulation symbol set and a second reference signal sequence; and the sending device obtains a first single-carrier time domain symbol, a second single-carrier time domain symbol, a third single-carrier time domain symbol, and a fourth single-carrier time domain symbol based on the first multiplexing set and the second multiplexing set, and sends the first single-carrier time domain symbol, the second single-carrier time domain symbol, the third single-carrier time domain symbol, and the fourth single-carrier time domain symbol.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

According to the foregoing method, the reference signal sequence is mapped to the modulation symbol set, to obtain a multiplexing set, where the multiplexing set occupies one single-carrier time domain symbol. Compared with a solution in which the reference signal sequence occupies one single-carrier time domain symbol, the foregoing method reduces time-domain overheads of the reference signal.

In a possible design, that the sending device obtains a first single-carrier time domain symbol, a second single-carrier time domain symbol, a third single-carrier time domain symbol, and a fourth single-carrier time domain symbol based on the first multiplexing set and the second multiplexing set is as follows: The sending device performs space-time block code (STBC) encoding on the first multiplexing set and the second multiplexing set, to obtain a first vector, a second vector, a third vector, and a fourth vector; and the sending device obtains the first single-carrier time domain symbol, the second single-carrier time domain symbol, the third single-carrier time domain symbol, and the fourth single-carrier time domain symbol based on the first vector, the second vector, the third vector, and the fourth vector.

According to the foregoing method, impact of high-frequency noise on STBC performance is reduced.

In a possible design, that a location of the first reference signal sequence in the first multiplexing set is the same as a location of the second reference signal sequence in the second multiplexing set includes:

both an index of the first reference signal sequence in the first multiplexing set and an index of the second reference signal sequence in the second multiplexing set is expressed as:

$$[n_0, n_0+1, \ldots, n_0+M-1], \text{ or } [\langle n_0, n_0+1, \ldots, n_0+M-1\rangle_N].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

The location design for the reference signal sequence in the foregoing manner ensures that channel estimation or channel sounding is correctly performed for the reference signal sequence on the premise that the reference signal sequence is mapped to the modulation symbol set, that is, time-domain overheads of the reference signal sequence are reduced.

In a possible design, the first vector is represented as $s(0)$, the second vector is represented as $-s^*(1)$, the third vector is represented as $s(1)$, and the fourth vector is represented as $s^*(0)$; or the first vector is represented as $s(0)$, the second vector is represented as $s^*(1)$, the third vector is represented as $s(1)$, and the fourth vector is represented as $-s^*(0)$.

$s(0)$ is a frequency-domain representation of the first multiplexing set, $s(1)$ is a frequency-domain representation of the second multiplexing set, "*" represents a conjugate operation, and "−" represents a negative operation.

In a possible design, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[\langle n_0, n_0 + 1, \ldots, n_0 + M - 1\rangle_N], \text{ or } [n_0, n_0 + 1, \ldots, n_0 + M - 1];$$

and an index of the second reference signal sequence in the second multiplexing set is expressed as:

$$[\langle N - n_0, N - n_0 - 1, \ldots, N - n_0 - M + 1\rangle_N],$$
$$\text{or } [N - n_0, N - n_0 - 1, \ldots, N - n_0 - M + 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

The location design for the reference signal sequence in the foregoing manner ensures that channel estimation or channel sounding is correctly performed for the reference signal sequence on the premise that the reference signal sequence is mapped to the modulation symbol set, that is, time-domain overheads of the reference signal sequence are reduced.

In a possible design, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

In a possible design, the first single-carrier time domain symbol and the second single-carrier time domain symbol are sent on different ports in a first time unit; and the third single-carrier time domain symbol and the fourth single-carrier time domain symbol are sent on different ports in a second time unit. The first time unit is adjacent or not adjacent to the second time unit in time domain.

In a possible design, at least one of the first reference signal sequence and the second reference signal sequence includes a cyclic prefix and/or a cyclic suffix.

According to the foregoing method, the reference signal sequence is capable of resisting multipath interference.

In a possible design, the length of the first multiplexing set is N, and the length of the first reference signal sequence is N/2, N/4, or N/8; and/or the length of the second multiplexing set is N, and the length of the second reference signal sequence is N/2, N/4, or N/8.

The length design in the foregoing method strikes a balance between time-domain overheads and performance, that is, ensures performance of the reference signal sequence and the modulation symbol set on the basis of reducing time-domain overheads of the reference signal sequence. In addition, performance of the sending device is simplified.

According to a second aspect, a reference signal sequence de-mapping method is provided. The method includes: A receiving device receives a first single-carrier time domain symbol, a second single-carrier time domain symbol, a third single-carrier time domain symbol, and a fourth single-carrier time domain symbol; the receiving device obtains a first multiplexing set and a second multiplexing set based on the first single-carrier time domain symbol, the second single-carrier time domain symbol, the third single-carrier time domain symbol, and the fourth single-carrier time domain symbol; the receiving device obtains a first modulation symbol set and/or a first reference signal sequence based on the first multiplexing set; and the receiving device obtains a second modulation symbol set and/or a second reference signal sequence based on the second multiplexing set.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

According to the foregoing method, the reference signal sequence is mapped to the modulation symbol set, to obtain a multiplexing set, where the multiplexing set occupies one single-carrier time domain symbol. Compared with a solution in which the reference signal sequence occupies one single-carrier time domain symbol, the foregoing method reduces time-domain overheads of the reference signal.

In a possible design, that the receiving device obtains a first multiplexing set and a second multiplexing set based on the first single-carrier time domain symbol, the second single-carrier time domain symbol, the third single-carrier time domain symbol, and the fourth single-carrier time domain symbol is: The receiving device obtains a first vector, a second vector, a third vector, and a fourth vector based on the first single-carrier time domain symbol, the second single-carrier time domain symbol, the third single-carrier time domain symbol, and the fourth single-carrier time domain symbol; and the receiving device performs STBC decoding on the first vector, the second vector, the third vector, and the fourth vector, to obtain the first multiplexing set and the second multiplexing set.

According to the foregoing method, impact of high-frequency noise on receiving performance of STBC is reduced.

In a possible design, that a location of the first reference signal sequence in the first multiplexing set is the same as a location of the second reference signal sequence in the second multiplexing set includes:

both an index of the first reference signal sequence in the first multiplexing set and an index of the second reference signal sequence in the second multiplexing set is expressed as:

$$[\langle n_0, n_0 + 1, \ldots, n_0 + M - 1\rangle_N], \text{ or } [n_0, n_0 + 1, \ldots, n_0 + M - 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

In a possible design, the first vector is represented as s(0), the second vector is represented as −s*(1), the third vector is represented as s(1), and the fourth vector is represented as s*(0); or the first vector is represented as s(0), the second vector is represented as s*(1), the third vector is represented as s(1), and the fourth vector is represented as −s*(0).

s(0) is a frequency-domain representation of the first multiplexing set, s(1) is a frequency-domain representation of the second multiplexing set, "*" represents a conjugate operation, and "−" represents a negative operation.

The location design for the reference signal sequence in the foregoing manner ensures that channel estimation or channel sounding is correctly performed for the reference signal sequence on the premise that the reference signal sequence is mapped to the modulation symbol set, that is, time-domain overheads of the reference signal sequence are reduced.

In a possible design, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[n_0, n_0+1, \ldots, n_0+M-1], \text{ or } [\langle n_0, n_0+1, \ldots, n_0+M-1\rangle_N];$$

and an index of the second reference signal sequence in the second multiplexing set is expressed as:

$$[\langle N-n_0, N-n_0-1, \ldots, N-n_0-M+1\rangle_N],$$
$$\text{or } [N-n_0, N-n_0-1, \ldots, N-n_0-M+1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N.

The location design for the reference signal sequence in the foregoing manner ensures that channel estimation or channel sounding is correctly performed for the reference signal sequence on the premise that the reference signal sequence is mapped to the modulation symbol set, that is, time-domain overheads of the reference signal sequence are reduced.

In a possible design, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

In a possible design, the first single-carrier time domain symbol and the second single-carrier time domain symbol are received on different ports in a third time unit; and the third single-carrier time domain symbol and the fourth single-carrier time domain symbol are received on different ports in a fourth time unit, where the third time unit is adjacent or not adjacent to the fourth time unit in time domain.

In a possible design, at least one of the first reference signal sequence and the second reference signal sequence includes a cyclic prefix and/or a cyclic suffix.

According to the foregoing method, the reference signal sequence is capable of resisting multipath interference.

In a possible design, the length of the first multiplexing set is N, and the length of the first reference signal sequence is N/2, N/4, or N/8; and/or the length of the second multiplexing set is N, and the length of the second reference signal sequence is N/2, N/4, or N/8.

The length design in the foregoing method strikes a balance between time-domain overheads and performance, that is, ensures performance of the reference signal sequence and the modulation symbol set on the basis of reducing time-domain overheads of the reference signal sequence. In addition, performance of the receiving device is simplified.

According to a third aspect, an apparatus is further provided. For beneficial effects, refer to the descriptions of the first aspect. Details are not described herein again. The apparatus has functions of implementing actions in the method embodiment of the first aspect, and the functions are implemented by hardware, or is implemented by hardware executing corresponding software. The hardware or the software includes one or more units corresponding to the foregoing functions. In a possible design, a structure of the apparatus includes a processing unit and a communication unit, and the units performs corresponding functions in the first aspect. For details, refer to the descriptions in the method embodiment. Details are not described herein again.

According to a fourth aspect, an apparatus is further provided. For beneficial effects, refer to the descriptions of the second aspect. Details are not described herein again. The apparatus has functions of implementing actions in the method embodiment of the second aspect, and the functions are implemented by hardware, or is implemented by hardware executing corresponding software. The hardware or the software includes one or more units corresponding to the foregoing functions. In a possible design, a structure of the apparatus includes a processing unit and a communication unit, and the units performs corresponding functions in the second aspect. For details, refer to the descriptions in the method embodiment. Details are not described herein again.

According to a fifth aspect, an apparatus is provided. For beneficial effects, refer to the descriptions of the first aspect. Details are not described herein again. A structure of the apparatus includes a processor, and further includes a communication interface or a memory. The processor is configured to support the sending device in performing the functions in the first aspect. The memory is coupled to the processor, and stores program instructions or data for the apparatus. The communication interface is configured to communicate with another device.

According to a sixth aspect, an apparatus is provided. For beneficial effects, refer to the descriptions of the second aspect. Details are not described herein again. A structure of the apparatus includes a processor, and further includes a communication interface or a memory. The processor is configured to support the receiving device in performing the functions in the second aspect. The memory is coupled to the processor, and stores program instructions or data for the apparatus. The communication interface is configured to communicate with another device.

According to a seventh aspect, an apparatus is provided, configured to implement the method according to any one of the foregoing aspects.

According to an eighth aspect, a computer-readable storage medium is provided, including a program or instructions; and when the program or the instructions is/are executed, the method according to any one of the foregoing aspects is performed.

According to a ninth aspect, a chip is provided. The chip is connected to a memory, and is configured to read and execute a computer program or instructions stored in the memory. When the computer program or the instruction is/are executed, the method according to any one of the foregoing aspects is performed.

According to a tenth aspect, a computer program product including instructions is provided. When the computer program product runs on a computer, the computer is enabled to perform the method according to any one of the foregoing aspects.

According to an eleventh aspect, a system is provided, including the sending device according to any one of the foregoing aspects and/or the receiving device according to any one of the foregoing aspects.

DESCRIPTION OF EMBODIMENTS

Figure 1:
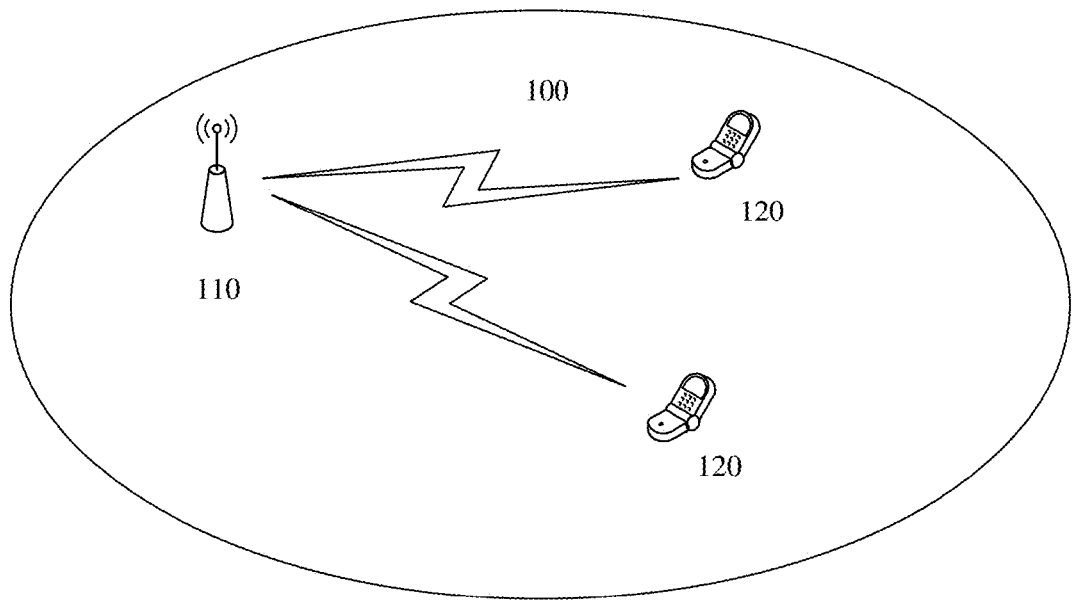
FIG. 1 is a schematic diagram of a structure of a communication system according to an embodiment of this application.

FIG. 1 shows a communication system 100 to which the embodiments of this application are applied. The communication system 100 includes at least a network device 110 and a terminal device 120. The network device 110 and the terminal device 120 communicates with each other through a Uu air interface. The Uu air interface is understood as a universal UE to network interface (universal UE to network interface) between the terminal device and the network device. Transmission over the Uu air interface includes uplink transmission and downlink transmission.

Uplink transmission means that the terminal device 120 sends uplink information to the network device 110, where the terminal device 120 serves as a sending device, and the network device 110 serves as a receiving device. The uplink information includes one or more of uplink data information, uplink control information, and a reference signal (RS). A channel used to transmit the uplink information is referred to as an uplink channel, and the uplink channel is a physical uplink shared channel (PUSCH) or a physical uplink control channel (PUCCH). The PUSCH is used to carry uplink data, and the uplink data further is referred to as uplink data information. The PUCCH is used to carry uplink control information (UCI) fed back by the terminal device. The UCI includes channel state information (CSI), an acknowledgment (ACK)/negative acknowledgment (NACK), and the like.

Downlink transmission means that the network device 110 sends downlink information to the terminal device 120, where the network device 110 serves as a sending device, and the terminal device 120 serves as a receiving device. The downlink information includes one or more of downlink data information, downlink control information, and a downlink reference signal. The downlink reference signal is a channel state information reference signal (CSI-RS) or a phase tracking reference signal (PTRS). A channel used to transmit the downlink information is referred to as a downlink channel, and the downlink channel is a physical downlink shared channel (PDSCH) or a physical downlink control channel (PDCCH). The PDCCH is used to carry downlink control information (DCI). The PDSCH is used to carry downlink data, and the downlink data further is referred to as downlink data information.

FIG. 1 shows an example of one network device and two terminal devices. The communication system 100 includes a plurality of network devices, and a coverage area of one network device includes another quantity of terminal devices other than two. This is not limited in this embodiment of this application. In the communication system 100 shown in FIG. 1, the network device 110 is a common network device, or is a network device having a relay node function. The terminal device 120 is a common terminal device, or is a terminal device having a relay node function, and so on. This is not limited.

For ease of understanding, an application scenario is provided for the communication system 100 shown in FIG. 1. The application scenario is merely an example for description, and is not intended to limit the embodiments of this application.

In the communication system 100 shown in FIG. 1, there is a scenario in which a relatively small amount of data is transmitted at a time, that is, the sending device sends a relatively small data packet to the receiving device. This scenario is referred to as a small packet transmission scenario. A typical small packet transmission scenario includes uplink/downlink control information transmission, low-latency data transmission, and the like. The small packet transmission scenario exists in uplink transmission, where the terminal device serves as a sending device, and the network device serves as a receiving device. Alternatively, the small packet transmission scenario exists in downlink transmission, where the network device serves as a sending device, and the terminal device serves as a receiving device.

In the small packet transmission scenario, to save time domain resources occupied by transmission and reduce a transmission latency, and the like, the sending device uses short-term transmission, that is, one transmission occupies a small quantity of time domain symbols, for example, one to two time domain symbols. In the foregoing small packet transmission scenario, in addition to transmitting the foregoing control information and/or data, the sending device further transmits an RS. The reference signal is used by the receiving device to perform channel estimation, channel sounding, or the like. In the foregoing small packet transmission scenario, a small quantity of time domain symbols is occupied during one transmission. Therefore, how to design transmission of the reference signal to avoid excessive time-domain overheads is currently a hot research topic.

Currently, for a time domain symbol using a multi-carrier waveform, frequency division multiplexing is performed on the control information or data that is transmitted in the small packet transmission scenario and the reference signal, to reduce time-domain overheads of the reference signal. However, for a time domain symbol of a single-carrier waveform, if frequency division multiplexing is performed on the control information or data that is transmitted in the small packet transmission scenario and the reference signal, PAPR performance of the single-carrier waveform is severely deteriorated. Therefore, a design of a reference signal with low time-domain overheads is more complex for the single-carrier waveform.

One solution is that: the reference signal occupies one single-carrier time domain symbol, and the control information or the data occupies one or more single-carrier time domain symbols. However, time-domain overheads of the reference signal are still large for the small packet transmission scenario.

In view of the foregoing descriptions, the embodiments of this application provide a reference signal sequence mapping and de-mapping method and an apparatus. A principle of the method is as follows: A sending device obtains a modulation symbol set based on control information or data to be transmitted. Then, the sending device maps a reference signal sequence to the modulation symbol set, to obtain a multiplexing set, where the multiplexing set occupies one single-carrier time domain symbol. Compared with the foregoing solution, in this method, a reference signal occupies one independent single-carrier time domain symbol. The method and the apparatus in the embodiments of this application undoubtedly reduces time-domain overheads of the reference signal. In addition, to correctly perform channel estimation for the reference signal, different reference signals meet conditions such as orthogonality or conjugate orthogonality, and locations of the reference signals in different multiplexing sets further meet corresponding conditions, and so on. The above conditions are described in detail in the following embodiments.

The reference signal sequence mapping and de-mapping method and the apparatus provided in the embodiments of this application is applied to a fourth generation (4G) communication system, for example, a long term evolution (LTE) system; a fifth generation (5G) communication system, for example, a new radio (NR) system; or various evolved communication systems in the future, for example, internet of things, internet of vehicles, and a sixth generation (6G) communication system.

The following describes some phrases or terms used in this application, which are also part of content of the present disclosure.

1. Terminal Device

The terminal device is a terminal for short, and is a device having a wireless transceiver function. The terminal device is deployed on land, including an indoor device, an outdoor device, a handheld device, or a vehicle-mounted device; or is deployed on a water surface (for example, on a ship); or is deployed in the air (for example, on an airplane, a balloon, or a satellite). The terminal device is a mobile phone (mobile phone), a tablet computer (pad), a computer having a wireless transceiver function, a virtual reality (VR) terminal device, an augmented reality (AR) terminal device, a wireless terminal device in industrial control (industrial control), a wireless terminal device in self driving (self driving), a wireless terminal device in telemedicine (telemedicine), a wireless terminal device in a smart grid (smart grid), a wireless terminal device in transportation safety (transportation safety), a wireless terminal device in a smart city (smart city), or a wireless terminal device in a smart home (smart home), and further includes user equipment (UE) and the like. The terminal device alternatively is a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, a vehicle-mounted device, a wearable device, a terminal device in the 5G network, a terminal device in future evolved 6G, or the like. The terminal device in some embodiments is referred to as a terminal, an access terminal device, a vehicle-mounted terminal device, an industrial control terminal device, a UE unit, a UE station, a mobile station, a remote station, a remote terminal device, a mobile device, a UE terminal device, a terminal device, a wireless communication device, a UE agent, a UE apparatus, or the like. The terminal device alternatively is fixed or movable. This is not limited in the embodiments of this application.

In the embodiments of this application, an apparatus configured to implement a terminal function is a terminal, or is an apparatus that supports the terminal to implement the function, for example, a chip system. The apparatus is installed in the terminal. In the embodiments of this application, the chip system includes a chip, or includes a chip and another discrete component. In the technical solutions provided in the embodiments of this application, the technical solutions provided in the embodiments of this application are described by using an example in which the apparatus for implementing a terminal function is a terminal and the terminal is UE.

2. Network Device

The network device is an access network device. The access network device further is referred to as a radio access network (RAN) device, and is a device that provides a wireless communication function for a terminal device. For example, the access network device includes but is not limited to: a next generation base station (gNodeB) in 5G, an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a transmission reception point (TRP), a transmission point (TP), a mobile switching center, and the like. Alternatively, the access network device is a radio controller, a centralized unit (CU), and/or a distributed unit (DU) in a cloud radio access network (CRAN) scenario, or the network device is a relay station, an access point, a vehicle-mounted device, a wearable device, a network device in a future 5G network, a network device in a future evolved PLMN network, or the like. The terminal device communicates with a plurality of access network devices using different technologies. For example, the terminal device communicates with an access network device supporting long term evolution (LTE), communicates with an access network device supporting 5G, or implements dual connectivity with an access network device supporting LTE and an access network device supporting 5G. This is not limited in the embodiments of this application.

In the embodiments of this application, an apparatus configured to implement a network device function is a network device, or is an apparatus that supports the network device to implement the function, for example, a chip system. The apparatus is installed in the network device. In the technical solutions provided in the embodiments of this application, the technical solutions provided in the embodiments of this application are described by using an example in which the apparatus for implementing a network device function is a network device and the network device is a base station.

3. Space-Time Block Code (STBC)

Figure 2A:
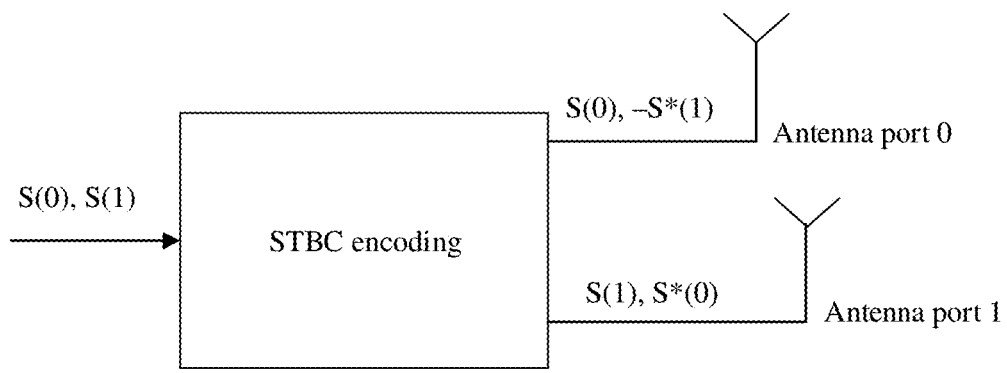
FIG. 2a is a schematic diagram of STBC encoding according to an embodiment of this application.

In the STBC technology, bits to be sent form a data packet and the data packet is transmitted through time and space expansion, which is therefore referred to as "space-time". As shown in FIG. 2a, principles of STBC encoding and decoding are described in detail by using an example in which there are two transmit antennas and input symbols are classified into two groups.

Figure 2B:
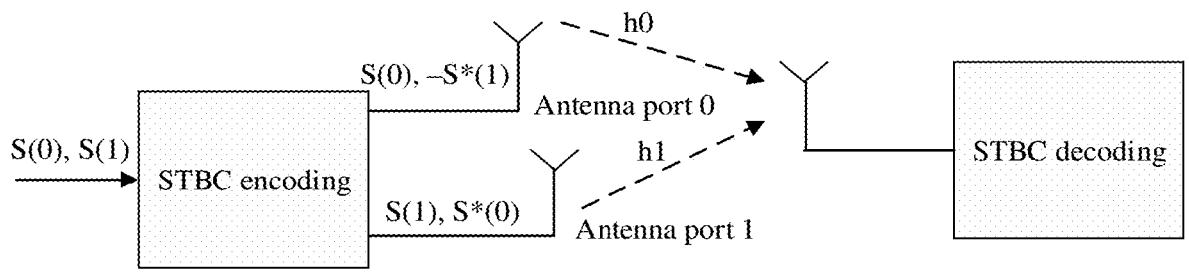
FIG. 2b is a schematic diagram of STBC encoding/decoding according to an embodiment of this application.

As shown in FIG. 2b, during each time of encoding, two modulation symbols S(0) and S(1) are classified into a group, and mapped to the antennas according to the following matrix:

$$S = \begin{bmatrix} X0 \\ X1 \end{bmatrix} = \begin{bmatrix} S(0) & -S^*(1) \\ S(1) & S^*(0) \end{bmatrix}.$$

Different columns in the matrix represent different transmit antenna ports, and rows represent different transmission moments. The first row of symbols X0=[S(0), −S*(1)] correspond to a transmit sequence on an antenna port 0, and the second row of symbols S1=[S(1), S*(0)] correspond to a transmit sequence on an antenna port 1. The first column indicates that S(0) and S(1) are sent at a moment 0, and the second column indicates that −S*(1) and S*(0) are sent at a moment 1. S(n) represents a complex modulation symbol, and a value of n is 0 or 1.

At a receive end, an assumption is made that channels of an antenna port P at the moment 0 and the moment 1 are the same, which is recorded as $h_p$. When a value of P is 0, the channels of the antenna port 0 at the moment 0 and the moment 1 is recorded as $h_0$. When the value of P is 1, the channels of the antenna port 1 at the moment 0 and the moment 1 is recorded as $h_1$.

As shown in FIG. 2b, a signal received by the receive end at the moment 0 is expressed as: y(0)=$h_0$s(0)+$h_1$s(1)+n(1); and a signal received by the receive end at the moment 1 is expressed as: y(1)=−$h_0$s*(1)+$h_1$s*(0)+n(2).

A conjugate operation is performed on the received signal at the moment 1, to obtain a receive vector:

$$y = \begin{bmatrix} y(0) \\ y^*(1) \end{bmatrix} = \begin{bmatrix} h_0 \\ h_1^* \end{bmatrix} s(0) + \begin{bmatrix} h_1 \\ -h_0^* \end{bmatrix} s(1) + \begin{bmatrix} n(0) \\ n^*(1) \end{bmatrix}.$$

Then, $w_0$=[$h^*_0 h_1$] and $w_1$=[$h^*_1 -h_0$] respectively multiply the receive vector y, to eliminate interference between s(0) and s(1), and to achieve a maximum diversity gain.

From the foregoing descriptions, in order to receive an STBC-encoded signal, the receive end uses channel information of the two transmit ports, that is, information of $h_0$ and $h_1$. A transmit end sends reference signals of the two ports, and the receive end measures the reference signals. In this way, the channel information of the two ports, that is, information of $h_0$ and $h_1$ is obtained.

Terms such as "first" and "second", for example, "a first modulation symbol set, a second modulation symbol set, a first reference signal sequence, a second reference signal sequence, a first multiplexing set, a second multiplexing set", and the like are used for distinguishing descriptions and is unable to be understood as indicating or implying relative importance, nor as indicating or implying an order. "At least one" means one or more, and "a plurality of" means two or more. The term "and/or" describes an association relationship between associated objects and represents that three relationships exists. For example, A and/or B represents the following cases: A exists, both A and B exist, and B exists, where A and B is singular or plural. The character "/" generally represents an "or" relationship between the associated objects. "At least one of the following items (pieces)" or a similar expression thereof means any combination of these items, including any combination of one item (piece) or a plurality of items (pieces). For example, at least one of a, b, and c represents: a, b, c, a and b, a and c, b and c, or a, b, and c, where a, b, and c is singular or plural.

Figure 3:
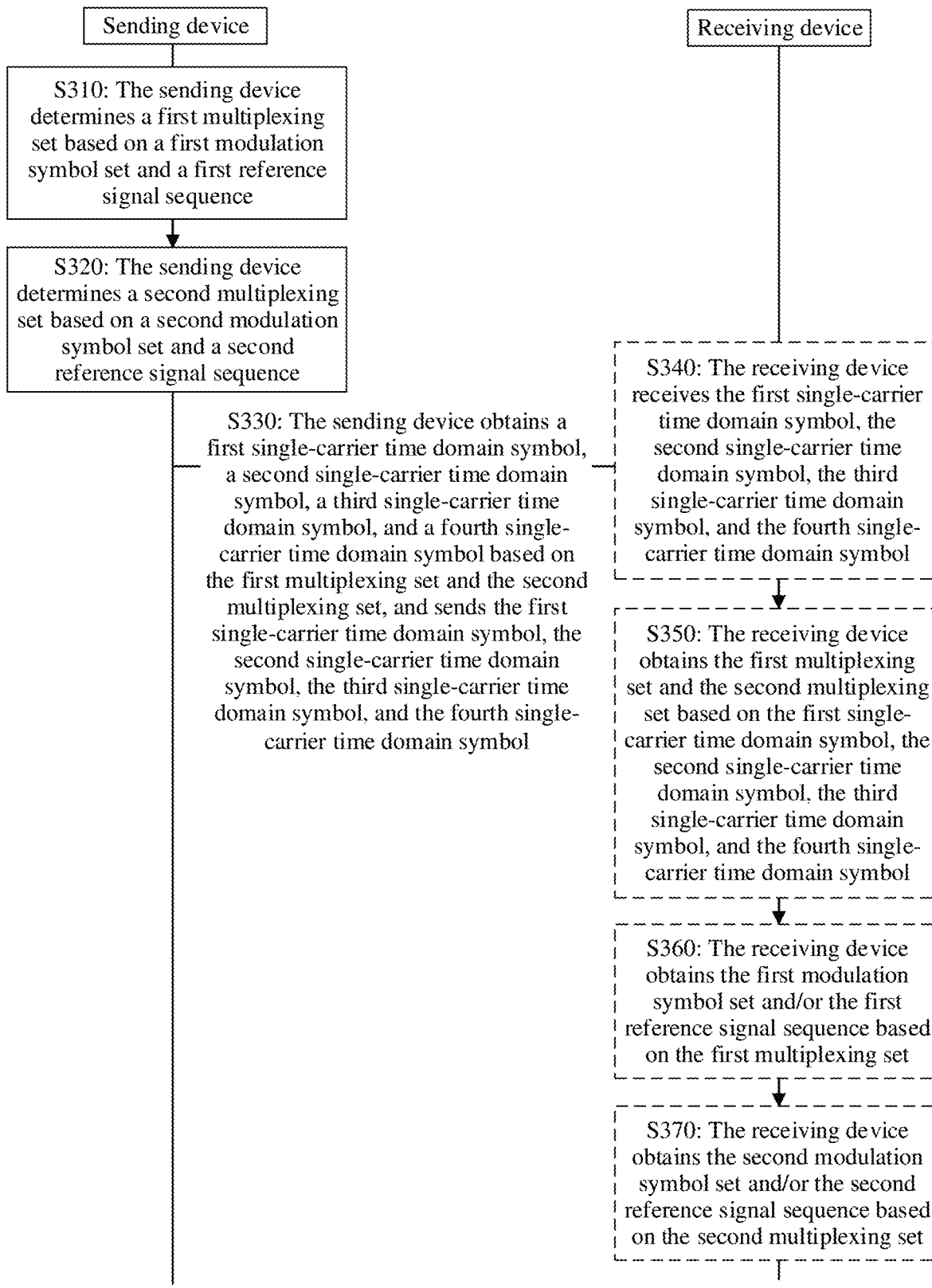
FIG. 3 is a flowchart of a reference signal sequence mapping and de-mapping method according to an embodiment of this application.

As shown in FIG. 3, a reference signal mapping and de-mapping method is provided. The method is jointly performed by a sending device and a receiving device. The sending device is the network device 110 in FIG. 1, and the receiving device is the terminal device 120 in FIG. 1. Alternatively, the sending device is the terminal device 120 in FIG. 1, and the receiving device is the network device 110 in FIG. 1. The procedure includes the following steps.

S310: The sending device determines a first multiplexing set based on a first modulation symbol set and a first reference signal sequence. The first modulation symbol set includes at least one modulation symbol.

For example, the sending device maps the first reference signal sequence to the first modulation symbol set, to obtain the first multiplexing set. The first reference signal sequence is located at a head, tail, or any middle location of the first modulation symbol set. This is not limited. Alternatively, the sending device multiplexes the first reference signal sequence and the first modulation symbol set, to obtain the first multiplexing set. Similarly, a location of the first reference signal sequence in the first multiplexing set is not limited.

S320: The sending device determines a second multiplexing set based on a second modulation symbol set and a second reference signal sequence. The second modulation symbol set includes at least one modulation symbol.

For example, the sending device maps the second reference signal sequence to the second modulation symbol set, to obtain the second multiplexing set. Alternatively, the sending device multiplexes the second reference signal sequence and the second modulation symbol set, to obtain the second multiplexing set. A location of the second reference signal sequence in the second multiplexing set is not limited.

The first reference signal sequence and the second reference signal sequence meet orthogonality or conjugate orthogonality; and the location of the first reference signal sequence in the first multiplexing set is the same as the location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

When the sum of the start index of the first reference signal sequence in the first multiplexing set and the start index of the second reference signal sequence in the second multiplexing set is equal to N, a sum of another index of the first reference signal sequence in the first multiplexing set and an index of a corresponding location of the second reference signal sequence in the second multiplexing set is further equal to N. For example, reference is made to the following example. For example, the first reference signal sequence includes three sampling points, which are respectively $W_1$, $W_2$, and $W_3$, where subscripts 1, 2, and 3 represent indexes, in the first multiplexing set, of the sampling points in the first reference signal sequence. Similarly, the second reference signal sequence includes three sampling points, which are respectively $W_x$, $W_y$, and $W_z$, where subscripts x, y, and z represent indexes, in the second multiplexing set, of the sampling points in the second reference signal sequence. A sum of the index 1 and the index x is equal to N, a sum of the index 2 and the index y is equal to N, and a sum of the index 3 and the index z is equal to N.

S330: The sending device obtains a first single-carrier time domain symbol, a second single-carrier time domain symbol, a third single-carrier time domain symbol, and a fourth single-carrier time domain symbol based on the first multiplexing set and the second multiplexing set, and sends the first single-carrier time domain symbol, the second single-carrier time domain symbol, the third single-carrier time domain symbol, and the fourth single-carrier time domain symbol.

For example, an implementation of S330 is as follows: The sending device performs STBC encoding on the first multiplexing set and the second multiplexing set, to obtain a first vector, a second vector, a third vector, and a fourth vector. The sending device obtains the first single-carrier time domain symbol, the second single-carrier time domain symbol, the third single-carrier time domain symbol, and the fourth single-carrier time domain symbol based on the first vector, the second vector, the third vector, and the fourth vector.

Figure 4A:
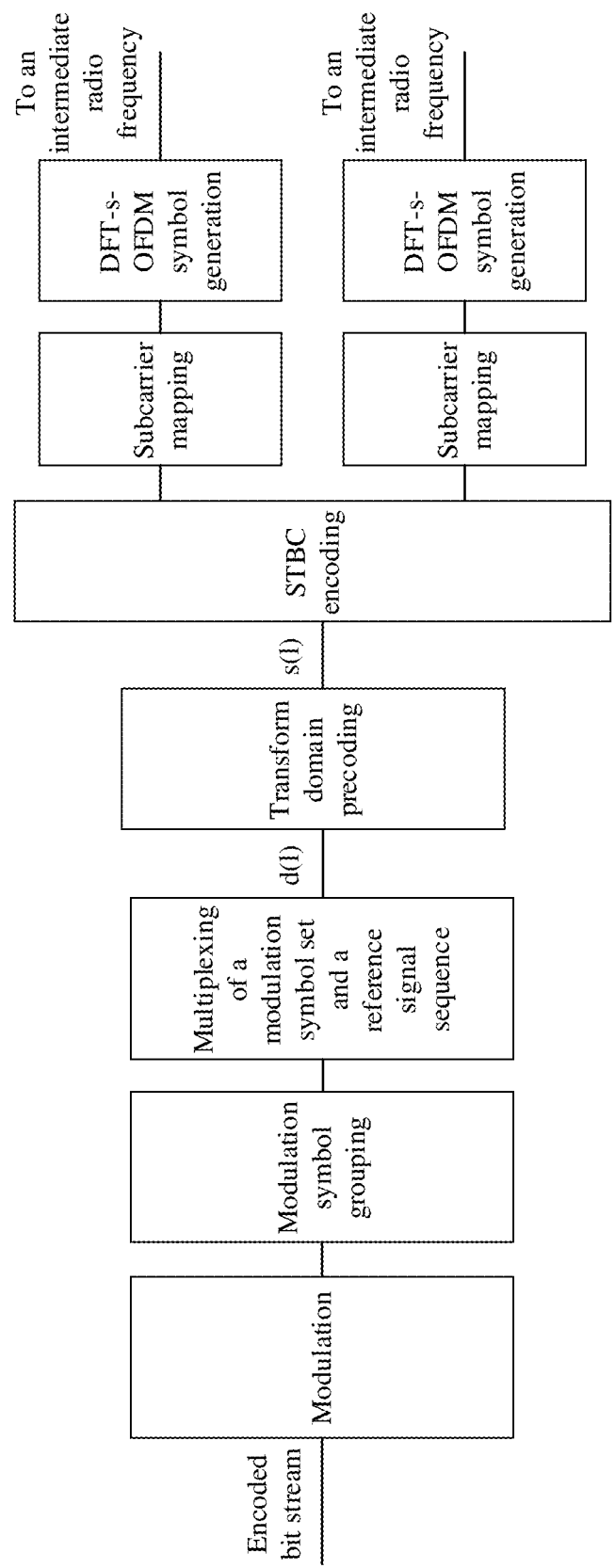
FIG. 4a is a schematic diagram of a structure in frequency domain of a DFT-s-OFDM transmitter according to an embodiment of this application.

In this embodiment of this application, the single-carrier time domain symbol includes a time domain symbol of a single carrier such as DFT-s-OFDM or SC-QAM. A DFT-s-OFDM single-carrier transmitter is used as an example to describe the method in the procedure in FIG. 3:

As shown in FIG. 4a, a frequency-domain representation of a structure of a DFT-s-OFDM transmitter includes units such as modulation, modulation symbol grouping, multiplexing of a modulation symbol set and a reference signal sequence, transform domain precoding, STBC encoding, subcarrier mapping, and DFT-s-OFDM symbol generation. DFT-s-OFDM symbol generation includes steps such as inverse fast Fourier transform (IFFT) and addition of a cyclic prefix (CP).

To-be-transmitted control information or data is encoded in advance to obtain an encoded bit stream. The encoded bit stream is input to the DFT-s-OFDM transmitter, and modulation and modulation symbol grouping are sequentially performed on the encoded bit stream to obtain a plurality of modulation symbol sets. For example, the plurality of modulation symbol sets include the first modulation symbol set and the second modulation symbol set. The first multiplexing set is obtained after the first modulation symbol set and the first reference signal sequence are multiplexed. The second modulation symbol set is mapped to the second reference signal sequence to obtain the second multiplexing set. The transform domain precoding is to perform discrete Fourier transform (DFT) on the first multiplexing set and the second multiplexing set. STBC encoding is performed on the first multiplexing set and the second multiplexing set obtained after the DFT transform, to obtain the first vector, the second vector, the third vector, and the fourth vector. Processes such as subcarrier mapping, and DFT-s-OFDM symbol generation are sequentially performed on the first vector, the second vector, the third vector, and the fourth vector to obtain the first single-carrier time domain symbol, the second single-carrier time domain symbol, the third single-carrier time domain symbol, and the fourth single-carrier time domain symbol. Finally, the first single-carrier time domain symbol, the second single-carrier time domain symbol, the third single-carrier time domain symbol, and the fourth single-carrier time domain symbol are mapped to an intermediate radio frequency for sending.

Figure 4B:
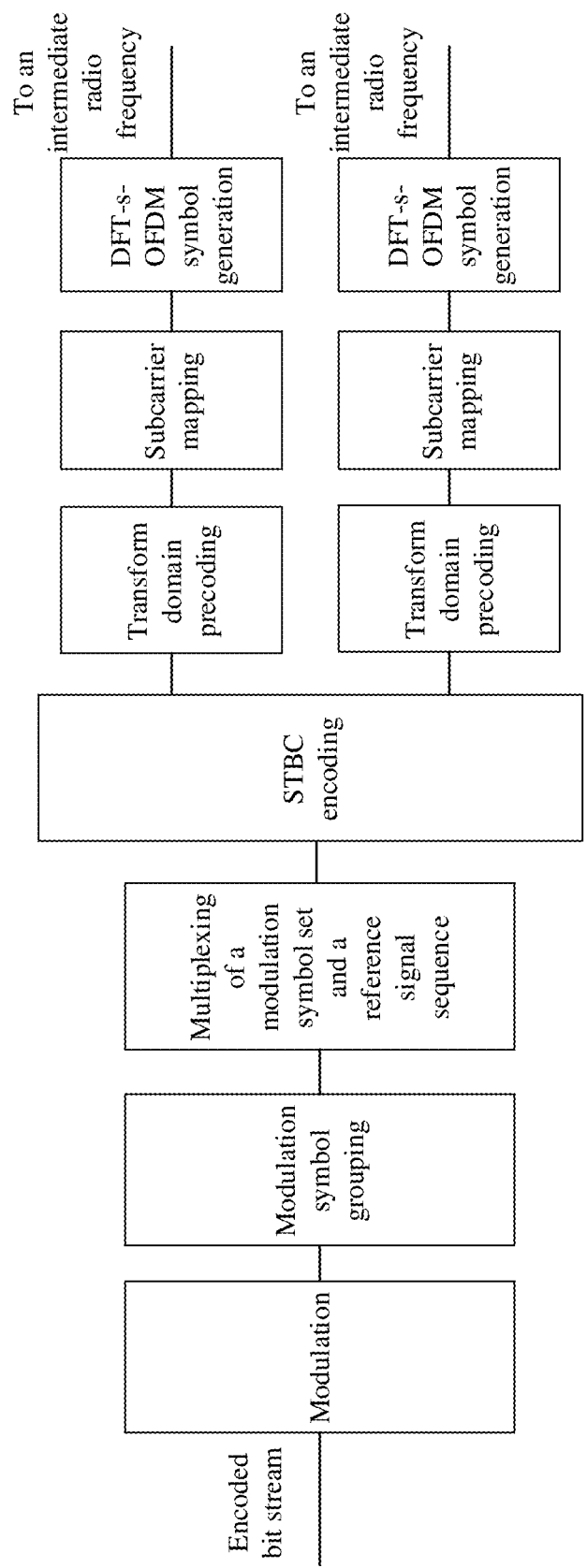
FIG. 4b is a schematic diagram of a structure in time domain of a DFT-s-OFDM transmitter according to an embodiment of this application.

As shown in FIG. 4b, a time-domain representation of the structure of the DFT-s-OFDM transmitter includes units such as modulation, modulation symbol grouping, multiplexing of a modulation symbol set and a reference signal sequence, STBC encoding, transform domain precoding, subcarrier mapping, and DFT-s-OFDM symbol generation. The time-domain representation of the structure of the DFT-s-OFDM transmitter shown in FIG. 4b is similar to the frequency-domain representation of the structure of the DFT-s-OFDM transmitter shown in FIG. 4a, and a difference between the two lies in that a location of the transform domain precoding is different. For example, in the frequency-domain representation of the structure of the DFT-s-OFDM transmitter shown in FIG. 4a, the transform domain precoding is located between the two units: "modulation symbol set" and "reference signal sequence multiplexing". In the time-domain representation of the structure of the DFT-s-OFDM transmitter shown in FIG. 4b, the transform domain precoding is located between "STBC encoding" and "subcarrier mapping". Therefore, for a processing process of each unit in the time-domain representation of the structure of the DFT-s-OFDM transmitter shown in FIG. 4b, refer to the descriptions in FIG. 4a. Details are not described herein again.

Optionally, the procedure shown in FIG. 3 further includes: S340. The receiving device receives the first single-carrier time domain symbol, the second single-carrier time domain symbol, the third single-carrier time domain symbol, and the fourth single-carrier time domain symbol.

S350: The receiving device obtains the first multiplexing set and the second multiplexing set based on the first single-carrier time domain symbol, the second single-carrier time domain symbol, the third single-carrier time domain symbol, and the fourth single-carrier time domain symbol.

An implementation of S350 is as follows: The receiving device obtains the first vector, the second vector, the third vector, and the fourth vector based on the first single-carrier time domain symbol, the second single-carrier time domain symbol, the third single-carrier time domain symbol, and the fourth single-carrier time domain symbol. The receiving device performs STBC decoding on the first vector, the second vector, the third vector, and the fourth vector, to obtain the first multiplexing set and the second multiplexing set.

Before performing STBC decoding, the receiver estimates channel responses of two transmit ports at two moments based on a first sequence and a second sequence that are locally stored or generated, and then perform STBC decoding based on the channel responses.

S360: The receiving device obtains the first modulation symbol set and/or the first reference signal sequence based on the first multiplexing set.

S370: The receiving device obtains the second modulation symbol set and/or the second reference signal sequence based on the second multiplexing set.

In this embodiment of this application, the first multiplexing set and the second multiplexing set each occupy one single-carrier time domain symbol. Compared with a solution in which the first reference signal sequence and the second reference signal sequence each occupy one single-carrier time domain symbol, the solution of this embodiment reduces time-domain overheads of the reference signal sequence. In addition, because the reference signal sequence exists at both a first moment and a second moment, the reference signal is used to independently estimate channel responses and phase rotations at different moments, and the solution of this embodiment reduces impact of phase noise of the transmitter and the receiver on receiving performance of STBC.

Example 1

In this embodiment of this application, the first reference signal sequence and the second reference signal sequence in the procedure shown in FIG. 3 meet orthogonality. The orthogonal manner of the first reference signal sequence and the second reference signal sequence is time-domain cyclic shift orthogonality, comb frequency division orthogonality, or the like, which is not limited. The location of the first reference signal sequence in the first multiplexing set is the same as the location of the second reference signal sequence in the second multiplexing set. Alternatively, the first reference signal sequence included in the first multiplexing set is located at a same time domain location as the second reference signal sequence included in the second multiplexing set.

For example, both an index of the first reference signal sequence in the first multiplexing set and an index of the second reference signal sequence in the second multiplexing set is expressed as:

$$[\langle n_0, n_0 + 1, \ldots, n_0 + M - 1 \rangle_N], \text{ or } [n_0, n_0 + 1, \ldots, n_0 + M - 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N. N represents the length of the first multiplexing set or the length of the second multiplexing set. For example, the length of the first multiplexing set is N, and includes N sampling points, and the first reference signal sequence successively occupies locations of an $n_0^{th}$ sampling point to an $(n_0+M-1)^{th}$ sampling point in the N sampling points in the first multiplexing set. Similarly, if the length of the second multiplexing set is N, and includes N sampling points, the second reference signal sequence successively occupies locations of an $n_0^{th}$ sampling point to an $(n_0+M-1)^{th}$ sampling point in the N sampling points in the second multiplexing set.

Figure 5:
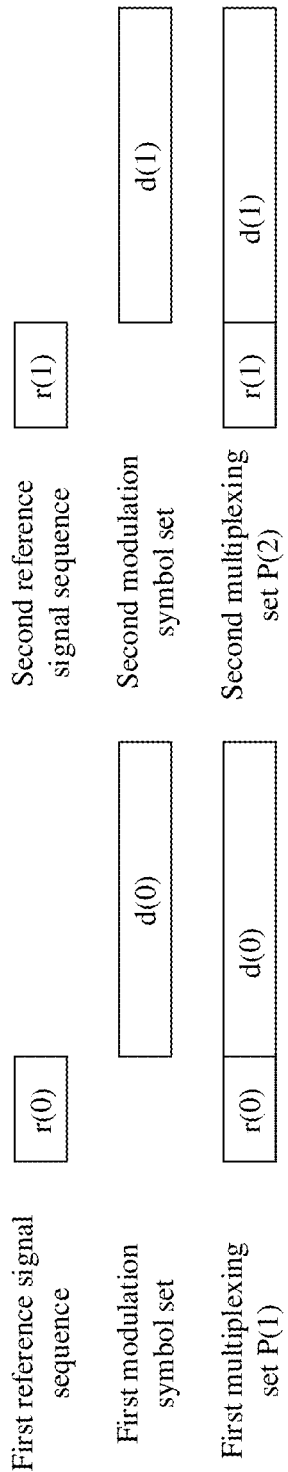
FIG. 5 is a schematic diagram of reference signal sequence mapping according to an embodiment of this application.

For example, as shown in FIG. 5, after a transmit end of the sending device completes modulation symbol grouping, a first modulation symbol set d(0) and a second modulation symbol set d(1) is obtained. The first modulation symbol set d(0) and a first reference signal sequence r(0) is multiplexed or mapped, and a set obtained after multiplexing or mapping is referred to as a first multiplexing set P(0). The second modulation symbol set d(1) and a second reference signal sequence r(1) are multiplexed or mapped, and a set obtained after multiplexing or mapping is referred to as a second multiplexing set P(1). Lengths of the first multiplexing set P(0) and the second multiplexing set P(1) is N, and N is a length of subsequent DFT transform. In FIG. 5, an example in which the first reference signal sequence r(0) is located at the head of the first multiplexing set, and the second reference signal sequence r(1) is located at the head of the second multiplexing set is used for description. Each of the first reference signal sequence r(0) and the second reference signal sequence r(1) is located at any location in the multiplexing set, which is not limited.

Alternatively, in this embodiment of this application, the first reference signal sequence is denoted as $r_0(m)$, the second reference signal sequence is denoted as $r_1(m)$, a value of m is a positive integer greater than or equal to 0 and less than or equal to M, and M is the length of the first reference signal sequence or the length of the second reference signal sequence. Both mapping the first reference signal sequence to the first multiplexing set and mapping the second reference signal sequence to the second multiplexing set is expressed as:

$$P(n_0 + m, l) = r_l(m), m = 0, 1, \ldots, M - 1.$$

$n_0$ represents a start location of mapping of the first reference signal sequence or a start location of mapping of the second reference signal sequence, and a value of l is 0 or 1. When a value of l is 0, representing an index of the first multiplexing set, an index of the first reference signal sequence, or an index of the first modulation symbol set; or when a value of l is 1, representing an index of the second multiplexing set, an index of the second reference signal sequence, or an index of the second modulation symbol set.

From the above formula a mapping location of the first reference signal sequence in the first multiplexing set is the same as a mapping location of the second reference signal sequence in the second multiplexing set. In other words, the index of the first reference signal sequence in the first multiplexing set and the index of the second reference signal sequence in the second multiplexing set is represented as:

$$[\langle n_0, n_0 + 1, \ldots, n_0 + M - 1 \rangle_N], \text{ or } [n_0, n_0 + 1, \ldots, n_0 + M - 1].$$

In the foregoing formula, if the index of the first reference signal sequence is greater than the length N of the first multiplexing set, the index of the first reference signal sequence modulo N or performs a remainder operation on N. Similarly, if the index of the second reference signal sequence is greater than the length N of the second multiplexing set, the index of the second reference signal sequence modulo N or performs a remainder operation on N.

In this embodiment of this application, the following two STBC encoding solutions are provided, which are a solution A and a solution C respectively. According to the two STBC encoding solutions, STBC encoding is performed on the first multiplexing set and the second multiplexing set generated by using the foregoing method. Each STBC encoding solution includes two representations: a frequency-domain representation and a time-domain representation.

Figure 6:
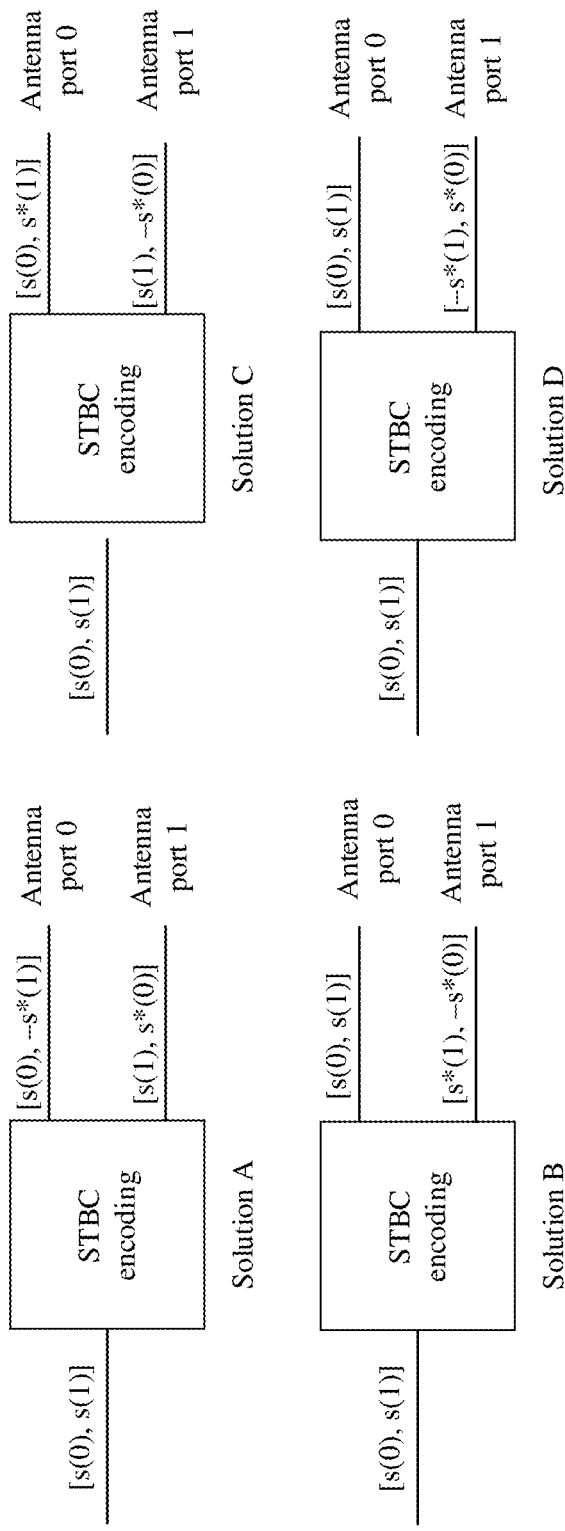
FIG. 6 is a schematic diagram of a frequency-domain representation of an STBC encoding solution according to an embodiment of this application.

A frequency-domain representation of the solution A is first introduced. As shown in FIG. 6, s(0) is used to represent a frequency-domain representation of the first multiplexing set, s(1) is used to represent a frequency-domain representation of the second multiplexing set, "*" is used to represent a conjugate operation, and "−" is used to represent a negative operation. Referring to the solution A in FIGS. 6, s(0) and s(1) are input at an input end of an STBC encoder, and four vectors are generated at an output end of an STBC encoder, which is referred to as the first vector, the second vector, the third vector, and the fourth vector. Further, the first vector is represented as s(0), the second vector is represented as −s*(1), the third vector is represented as s(1), and the fourth vector is represented as s*(0). The first vector s(0) and the second vector −s*(1) is transmitted on an antenna port 0, and the third vector s(1) and the fourth vector s*(0) is transmitted on an antenna port 1. The first vector s(0) and the third vector s(1) are transmitted at a same moment (for example, a moment 0), and the second vector −s*(1) and the fourth vector s*(0) are transmitted at a same moment (for example, a moment 1).

Figure 7:
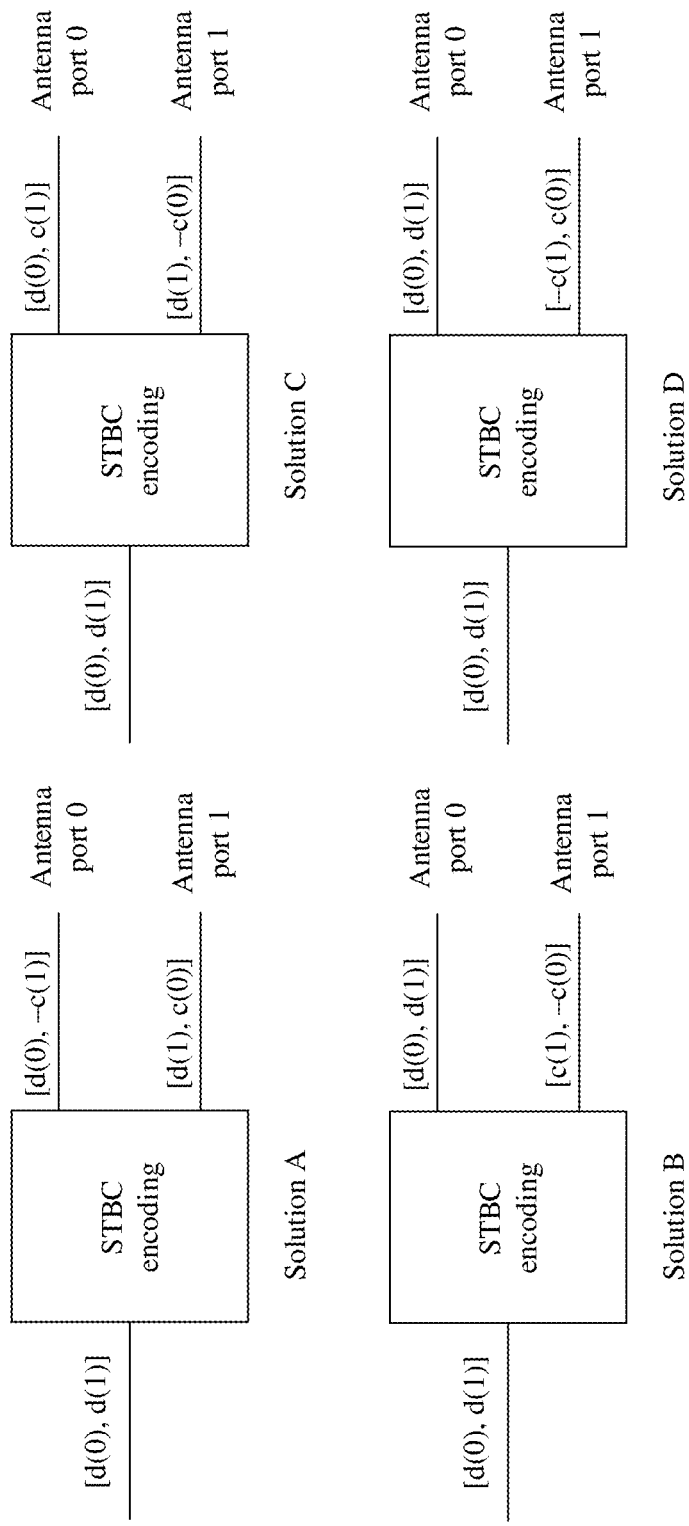
FIG. 7 is a schematic diagram of a time-domain representation of an STB encoding solution according to an embodiment of this application.

For a frequency-domain representation of the solution C, reference still is made to FIG. 6. s(0) is used to represent the frequency-domain representation of the first multiplexing set, s(1) is used to represent the frequency-domain representation of the second multiplexing set, "*" is used to represent a conjugate operation, and "−" is used to represent a negative operation. s(0) and s(1) are input at an input end of an STBC encoder, and four vectors are generated at an output end of an STBC encoder, which is referred to as the first vector, the second vector, the third vector, and the fourth vector. The first vector is represented as s(0), the second vector is represented as s*(1), the third vector is represented as s(1), and the fourth vector is represented as −s*(0). The first vector s(0) and the second vector s*(1) is transmitted on the antenna port 0, and the third vector s(1) and the fourth vector −s*(0) is transmitted on the antenna port 1. The first vector s(0) and the third vector s(1) are transmitted at a same moment, and the second vector s*(1) and the fourth vector −s*(0) are transmitted at a same moment.

s(l)=Fd(l), where F is a DFT matrix, and a function of Fd(l) is to perform discrete Fourier transform on d(l). Therefore, s(0) and s(1) is denoted as d(0) and d(1) respectively before DFT, and s*(0) and s*(1) is denoted as c(0) and c(1) respectively before DFT, that is, s*(l)=Fc(l). In addition, from a property of the DFT that d(n, l)=c*(N−n, l), where d(n, l) and c(n, l) are an $n^{th}$ element in d(l) and c(l) respectively, and N represents a point quantity of the DFT. Therefore, STBC encoding in the solution A and the solution C respectively is equivalent to a solution A and a solution C in a time-domain representation in FIG. 7.

Figure 8:
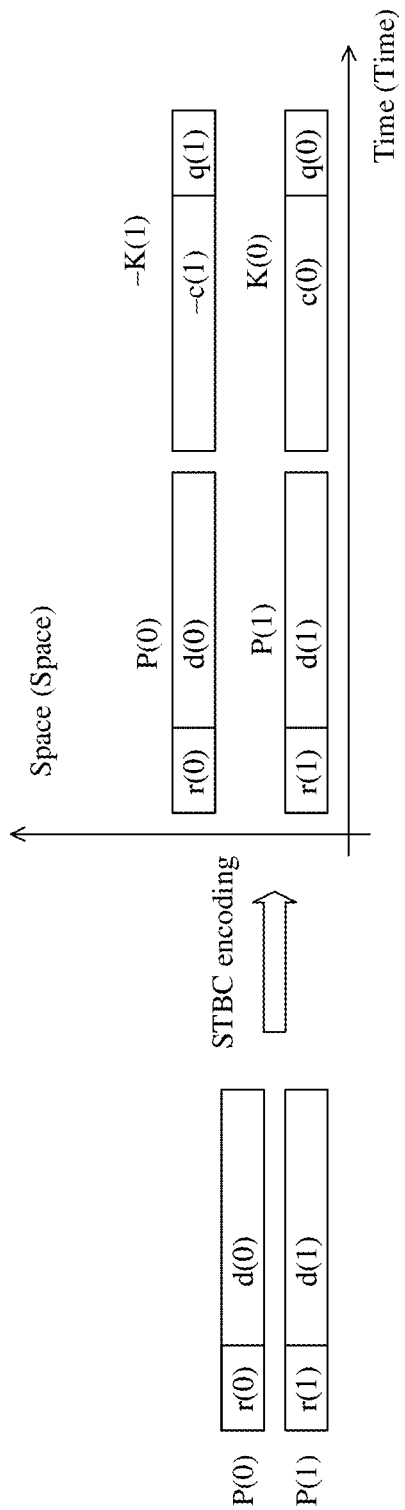
FIG. 8 is a schematic diagram of an STBC encoding solution according to an embodiment of this application.

For a time-domain representation of STBC encoding in the foregoing solution A, an implementation process is provided: As shown in FIG. 8, the first modulation symbol set is represented as d(0), the first reference signal sequence is represented as r(0), and the first multiplexing set is represented as P(0). The second modulation symbol set is represented as d(1), the second reference signal sequence is represented as r(1), and the second multiplexing set is represented as P(1). The first vector, the second vector, the third vector, and the fourth vector is obtained after mapping according to the foregoing method and STBC encoding according to the solution A are performed. The first vector is represented as P(0), the second vector is represented as P(1), the third vector is represented as −K(1), and the fourth vector is represented as K(0). For representations of P(0), P(1), −K(1), and K(0), refer to descriptions in FIG. 8. Further, from the property of the DFT that P(n, l)=K*(N−n, l), where P(n, l) and K(n, l) are an $n^{th}$ element in P(l) and k(l) respectively, N represents a point quantity of the DFT, and a value of l is 0 or 1.

The first vector corresponds to the first single-carrier time domain symbol, the second vector corresponds to the second single-carrier time domain symbol, the third vector corresponds to the third single-carrier time domain symbol, and the fourth vector corresponds to the fourth single-carrier time domain symbol. The first single-carrier time domain symbol and the second single-carrier time domain symbol is sent on different ports in a first time unit. For example, the first single-carrier time domain symbol and the second single-carrier time domain symbol is respectively sent on the antenna port 0 and the antenna port 1 at the moment 0. The third single-carrier time domain symbol and the fourth single-carrier time domain symbol is sent on different ports in a second time unit. For example, the third single-carrier time domain symbol and the fourth single-carrier time domain symbol is respectively sent on the antenna port 0 and the antenna port 1 at the moment 1. The first time unit is adjacent to the second time unit in time domain Correspondingly, the receiving device receives the first single-carrier time domain symbol and the second single-carrier time domain symbol on different antenna ports in a third time unit, and receive the third single-carrier time domain symbol and the fourth single-carrier time domain symbol on different antenna ports in a fourth time unit, where the third time unit is adjacent to the fourth time unit.

From the descriptions in FIG. 8, after mapping according to the method and STBC encoding according to the solution A are performed, the first modulation symbol set d(0) and the second modulation symbol set d(1) is transformed into d(0), d(1), c(0), and c(1); and the first reference signal sequence r(0) and the second reference signal sequence r(1) is transformed into r(0), r(1), q(1), and q(2). r(l) and q(l) meet the following relationship:

$$r(l) = [r_l(0), r_l(1), ..., r_l(M-1)]^T; \text{ and}$$

$$q(l) = [r_l^*(M-1), ..., r_l^*(1), r_l^*(0)]^T.$$

Example 2

The first reference signal sequence and the second reference signal sequence in the procedure shown in FIG. 3 meet conjugate orthogonality. The conjugate orthogonality includes the following: A sequence obtained after a conjugate operation is performed on the first reference signal sequence is orthogonal to the second reference signal sequence; or the first reference signal sequence is orthogonal to a sequence obtained after a conjugate operation is performed on the second reference signal sequence; and so on. The orthogonal manner of the first reference signal sequence and the second reference signal sequence is time-domain cyclic shift orthogonality, comb frequency division orthogonality, or the like, which is not limited. A sum of the start index of the first reference signal sequence in the first multiplexing set and the start index of the second reference signal sequence in the second multiplexing set is equal to N. For example, an index of the first reference signal sequence in the first multiplexing set is represented as:

$$[\langle n_0, n_0+1, \ldots, n_0+M-1\rangle_N], \text{ or } [n_0, n_0+1, \ldots, n_0+M-1].$$

An index of the second reference signal sequence in the second multiplexing set is expressed as:

$$[\langle N-n_0, N-n_0-1, \ldots, N-n_0-M+1\rangle_N],$$
$$\text{or } [N-n_0, N-n_0-1, \ldots, N-n_0-M+1].$$

N represents the length of the first multiplexing set or the length of the second multiplexing set, $n_0$ represents the start location of the first reference signal sequence in the first multiplexing set or the start location of the second reference signal sequence in the second multiplexing set, M represents the length of the first reference signal sequence or the length of the second reference signal sequence, and $\langle \ \rangle_N$ represents a remainder operation or modulo operation performed on N.

For example, the first multiplexing set includes N sampling points, the first reference signal sequence includes M sampling points with indexes from 0 to M−1 respectively, and the first reference signal sequence successively occupies locations of an $n_0{}^{th}$ sampling point to an $(n_0+M-1)^{th}$ sampling point in the N sampling points in the first multiplexing set. Similarly, the second multiplexing set includes N sampling points with indexes from 0 to M−1 respectively, and the second reference signal sequence successively occupies locations of an $(N-n_0)^{th}$ sampling point to an $(N-n_0-M+1)^{th}$ sampling point in the N sampling points in the second multiplexing set.

Figure 9:
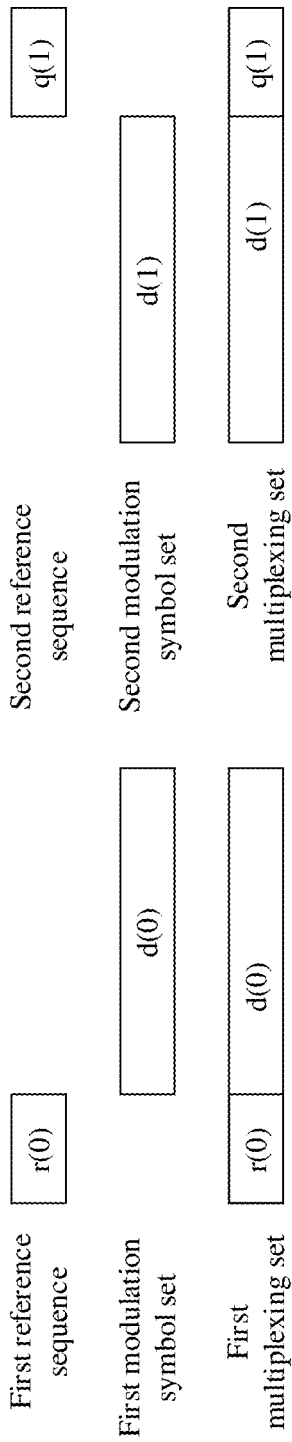
FIG. 9 is a schematic diagram of reference signal sequence mapping according to an embodiment of this application.

For example, as shown in FIG. 9, after the transmit end of the sending device completes modulation symbol grouping, the first modulation symbol set d(0) and the second modulation symbol set d(1) is obtained. The first modulation symbol set d(0) and the first reference signal sequence r(0) is multiplexed or mapped, and a set obtained after multiplexing or mapping is referred to as the first multiplexing set. The second modulation symbol set d(1) and a second reference signal sequence q(1) are multiplexed or mapped, and a set obtained after multiplexing or mapping is referred to as the second multiplexing set. In FIG. 9, an example in which the first reference signal sequence r(0) is located at the head of the first multiplexing set, and the second reference signal sequence q(1) is located at the head of the second multiplexing set is used for description. Each of the first reference signal sequence r(0) and the second reference signal sequence q(1) is located at any location in the multiplexing set, which is not limited.

In this embodiment of this application, the following two STBC encoding solutions are provided, which are a solution B and a solution D respectively. According to the two STBC encoding solutions, STBC encoding is performed on the first multiplexing set and the second multiplexing set generated by using the foregoing method. Each STBC encoding solution includes two representations: a frequency-domain representation and a time-domain representation.

A frequency-domain representation of the solution B is first introduced. Still referring to FIG. 6, s(0) is used to represent the frequency-domain representation of the first multiplexing set, s(1) is used to represent the frequency-domain representation of the second multiplexing set, "*" is used to represent a conjugate operation, and "−" is used to represent a negative operation. Referring to the solution B in FIGS. 6, s(0) and s(1) are input at an input end of an STBC encoder, and four vectors are generated at an output end of an STBC encoder, which is referred to as the first vector, the second vector, the third vector, and the fourth vector. Further, the first vector is represented as s(0), the second vector is represented as s(1), the third vector is represented as s*(1), and the fourth vector is represented as −s*(0). The first vector s(0) and the second vector s(1) is transmitted on the antenna port 0, and the third vector s*(1) and the fourth vector −s*(0) is transmitted on the antenna port 1. The first vector s(0) and the third vector s*(1) are transmitted at a same moment, and the second vector s(1) and the fourth vector −s*(0) are transmitted at a same moment.

For a frequency-domain representation of the solution D, reference still is made to FIG. 6. s(0) is used to represent the frequency-domain representation of the first multiplexing set, s(1) is used to represent the frequency-domain representation of the second multiplexing set, "*" is used to represent a conjugate operation, and "−" is used to represent a negative operation. s(0) and s(1) are input at an input end of an STBC encoder, and four vectors are generated at an output end of an STBC encoder, which is referred to as the first vector, the second vector, the third vector, and the fourth vector. The first vector is represented as s(0), the second vector is represented as s(1), the third vector is represented as −s*(1), and the fourth vector is represented as s*(0). The first vector s(0) and the second vector s(1) is transmitted on the antenna port 0, and the third vector −s*(1) and the fourth vector s*(0) is transmitted on the antenna port 1. The first vector s(0) and the third vector −s*(1) are transmitted at a same moment, and the second vector s(1) and the fourth vector s*(0) are transmitted at a same moment.

Similarly, s(l)=Fd(l), where F is a DFT matrix, and a function of Fd(l) is to perform Fourier transform on d(l). Therefore, s(0) and s(1) is denoted as d(0) and d(1) respectively before DFT, and s*(0) and s*(1) is denoted as c(0) and c(1) respectively before. Therefore, STBC encoding in the solution B and the solution D respectively is equivalent to a solution B and a solution D in a time-domain representation in FIG. 7.

Figure 10:
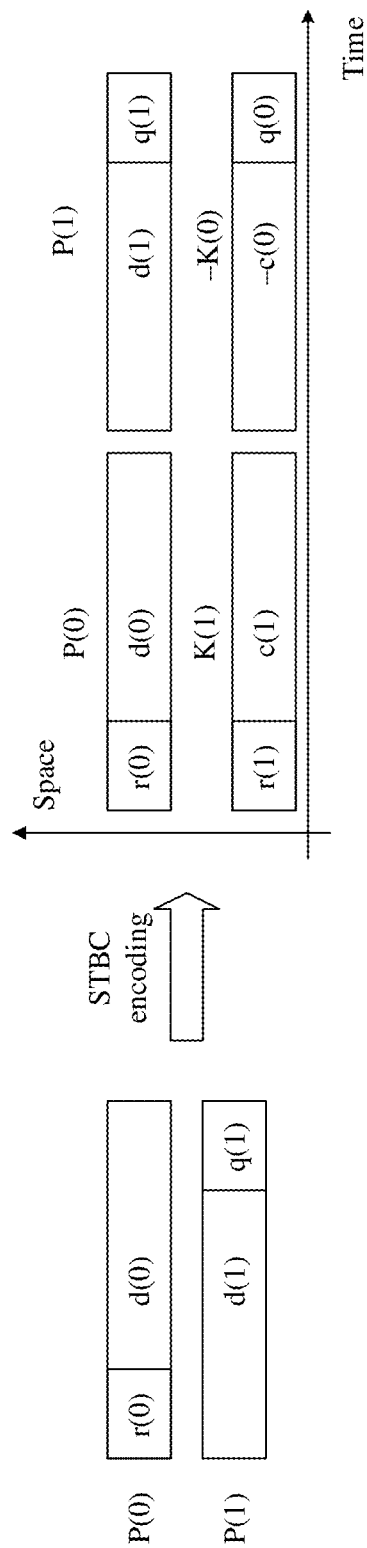
FIG. 10 is a schematic diagram of an STBC encoding solution according to an embodiment of this application.

For a time-domain representation of STBC encoding in the foregoing solution B, an implementation process is provided: As shown in FIG. 10, the first modulation symbol set is represented as d(0), the first reference signal sequence is represented as r(0), and the first multiplexing set is represented as P(0). The second modulation symbol set is represented as d(1), the second reference signal sequence is represented as q(1), and the second multiplexing set is represented as P(1). The following four vectors are obtained after mapping according to the foregoing method and STBC encoding according to the solution B are performed: the first vector represented as P(0), the second vector represented as K(1), the third vector represented as P(1), and the fourth vector represented as −K(0). For representations of P(0), P(1), K(1), and −K(0), refer to descriptions in FIG. 10. Further, from the property of the DFT that P(n, l)=K*(N−n, l), where P(n, l) and K(n, l) are an $n^{th}$ element in P(l) and k(l) respectively, N represents a point quantity of the DFT, and a value of l is 0 or 1.

After subcarrier mapping and OFDM symbol generation are performed on each of the four vectors, each vector corresponds to one single-carrier time domain symbol, and the four vectors corresponds to four single-carrier time domain symbols, which are the first single-carrier time domain symbol, the second single-carrier time domain symbol, the third single-carrier time domain symbol, and the fourth single-carrier time domain symbol respectively. The first single-carrier time domain symbol and the second single-carrier time domain symbol is transmitted on different ports in the first time unit, and the third single-carrier time domain symbol and the fourth single-carrier time domain symbol is transmitted on different ports in the second time unit, where the first time unit is adjacent to the second time unit in time domain. Correspondingly, the receiving device receives the first single-carrier time domain symbol and the second single-carrier time domain symbol on different ports in the third time unit, and receive the third single-carrier time domain symbol and the fourth single-carrier time domain symbol on different ports in the fourth time unit, where the third time unit is adjacent to the fourth time unit in time domain.

In FIG. 9, the first modulation symbol set d(0) is transformed into d(0) and −c(0) after STBC encoding, the second modulation symbol set d(1) is transformed into c(1) and d(1) after STBC encoding, the first reference signal sequence r(0) is transformed into r(0) and q(0) after STBC encoding, and the second reference signal sequence q(1) is transformed into r(1) and q(1) after STBC encoding.

Example 3

The first single-carrier time domain symbol and the second single-carrier time domain symbol in the procedure shown in FIG. 3 are sent on different ports in the first time unit, and the third single-carrier time domain symbol and the fourth single-carrier time domain symbol are sent on different ports in the second time unit. The first time unit is adjacent or not adjacent to the second time unit in time domain. For a manner in which the first time unit is adjacent to the second time unit in time domain, refer to the foregoing Example 1 and Example 2. The following describes in detail a manner in which the first time unit is not adjacent to the second time unit in time domain.

Figure 11:
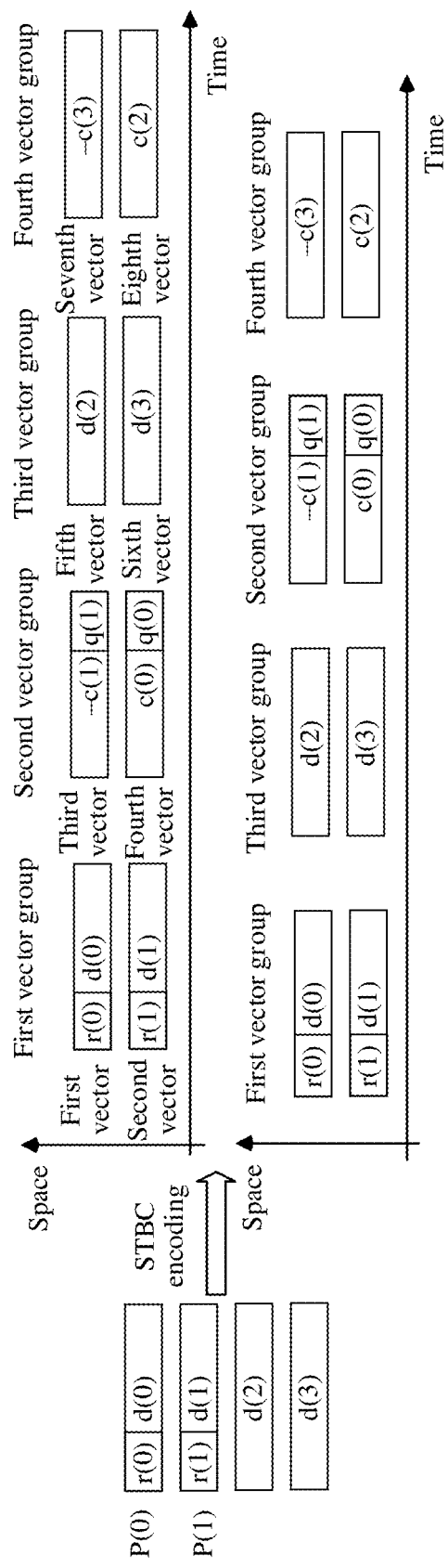
FIG. 11 is a schematic diagram of an STBC encoding solution according to an embodiment of this application.

In this embodiment of this application, the foregoing solution in which the reference signal sequence is carried in the modulation symbol set shown in FIG. 3 is used for some modulation symbol sets, and for other modulation symbol sets, a solution in which no reference signal sequence is carried in the modulation symbol set is used. As shown in FIG. 11, the first multiplexing set is represented as P(0), and the second multiplexing set is represented as P(1). STBC encoding is performed on the first multiplexing set P(0) and the second multiplexing set P(1) to obtain a first vector group and a second vector group. The first vector group includes the first vector and the second vector. The second vector group includes the third vector and the fourth vector. For the first multiplexing set P(0), the second multiplexing set P(1), the first vector group, the second vector group, the first vector, the second vector, the third vector, and the fourth vector, refer to descriptions in FIG. 11.

STBC encoding is performed on a third modulation symbol set d(2) and a fourth modulation symbol set d(4) to obtain a third vector group and a fourth vector group. The third vector group includes a fifth vector and a sixth vector. The fourth vector group includes a seventh vector and an eighth vector. For the third vector group, the fourth vector group, the fifth vector, the sixth vector, the seventh vector, and the eighth vector, refer to the descriptions in FIG. 11.

In this embodiment of this application, after separately performing STBC encoding on the first multiplexing set, the second multiplexing set, the third modulation symbol set, and the fourth modulation symbol set, the sending device performs time-domain sorting on the first vector group, the second vector group, the third vector group, and the fourth vector group. For example, as shown in FIG. 11, a sorting manner is sorting in ascending order in time domain, that is, the first vector group, the third vector group, the second vector group, and the fourth vector group. Subsequently, subcarrier mapping and single-carrier symbol generation are sequentially performed on the first vector group, the third vector group, the second vector group, and the fourth vector group, to generate eight single-carrier time domain symbols, which are sent by using an intermediate radio frequency. The first single-carrier time domain symbol and the second single-carrier time domain symbol are sent in the first time unit, where the first single-carrier time domain symbol and the second single-carrier time domain symbol respectively correspond to the first vector and the second vector in the first vector group. A fifth single-carrier time domain symbol and a sixth single-carrier time domain symbol are sent in the third time unit, where the fifth single-carrier time domain symbol and the sixth single-carrier time domain symbol correspond to the fifth vector and the sixth vector in the third vector group. The third single-carrier time domain symbol and the fourth single-carrier time domain symbol are sent in the second time unit, where the third single-carrier time domain symbol and the fourth single-carrier time domain symbol respectively correspond to the third vector and the fourth vector in the second vector group. A seventh single-carrier time domain symbol and an eighth single-carrier time domain symbol are sent in the fourth time unit, where the seventh single-carrier time domain symbol and the eighth single-carrier time domain symbol respectively correspond to the seventh vector and the eighth vector in the fourth vector group. The first time unit, the third time unit, the second time unit, and the fourth time unit are adjacent time units in time domain. The first time unit is not adjacent to the second time unit in time domain.

The reference signal in this embodiment of this application includes but is not limited to a demodulation reference signal (DMRS) or the like. In addition, to make the reference signal sequence capable of resisting multipath interference, a cyclic prefix and/or a cyclic suffix is added to the reference signal sequence. In other words, the first reference signal sequence includes a cyclic prefix and/or a cyclic suffix, and the second reference signal sequence includes a cyclic prefix or a cyclic suffix.

Optionally, the reference signal sequence uses a low PAPR sequence, for example, a ZC sequence, a computer-searched frequency domain QPSK sequence, a time domain pi/2-BPSK sequence, or a computer-searched time domain M-PSK sequence.

To simplify implementation of the receiver, when a length of the multiplexing set is N, a length of the reference signal sequence is N/2, N/4, N/8, or the like, where N/4 is a useful length. The foregoing process is further described as follows: When a length of the first multiplexing set is N, the length of the reference signal sequence is a value of N/2, N/4, N/8, or the like. Similarly, when a length of the second multiplexing set is N, the length of the reference signal sequence is a value of N/2, N/4, N/8, or the like.

The embodiments described in this specification is independent solutions, or is combined based on internal logic. These solutions fall within the protection scope of this application.

In the foregoing method embodiments, the method and the operation implemented by the terminal device alternatively is implemented by a component (for example, a chip or a circuit) of the terminal device. The method and the operation implemented by the network device alternatively is implemented by a component (for example, a chip or a circuit) of the network device. In the foregoing embodiments provided in this application, the methods provided in the embodiments of this application are separately described from perspectives of the sending device, the receiving device, and interaction between the sending device and the receiving device. To implement functions in the foregoing methods provided in the embodiments of this application, the sending device and the receiving device includes a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The foregoing describes in detail the method provided in the embodiments of this application with reference to FIG. 1 to FIG. 11. The following describes in detail an apparatus provided in the embodiments of this application with reference to FIG. 12 and FIG. 13. Descriptions of the apparatus embodiment correspond to the descriptions of the method embodiment. Therefore, for content not described in detail, refer to the descriptions in the foregoing method embodiment.

Figure 12:
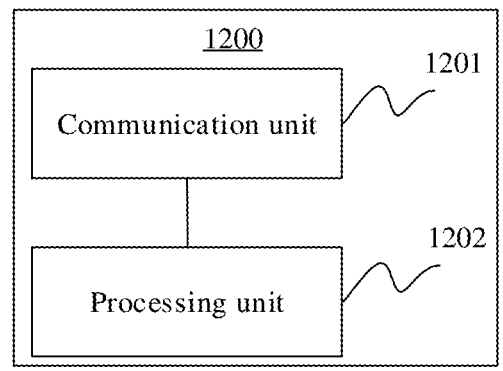
FIG. 12 is a schematic diagram of a structure of an apparatus according to an embodiment of this application.

FIG. 12 is a schematic block diagram of an apparatus 1200 according to an embodiment of this application, and is configured to implement a function of a sending device or a receiving device in the foregoing method. For example, the apparatus is a software module or a chip system. The chip system includes a chip and alternatively includes a chip and another discrete device. The apparatus 1200 includes a communication unit 1201, and further includes a processing unit 1202. The communication unit 1201 communicates with the external. The processing unit 1202 is configured to perform processing. For example, the processing unit 1202 obtains a first multiplexing set based on a first modulation symbol set and a first reference signal sequence, and so on. The communication unit 1201 includes a sending unit, a receiving unit, and/or the like, which are respectively configured to perform sending steps of the sending device, receiving steps of the receiving device, and the like in the foregoing procedure in FIG. 3.

In an example, the apparatus 1200 implements corresponding steps performed by the sending device in the procedure shown in FIG. 3. The apparatus 1200 is a terminal device, or a chip or a circuit configured in the terminal device, or is a network device, or a chip or a circuit configured in the network device. The communication unit 1201 is configured to perform a transceiver-related operation of the sending device in the foregoing method embodiment, and the processing unit 1202 is configured to perform a processing-related operation of the sending device in the foregoing method embodiment.

For example, the processing unit 1202 is configured to: determine a first multiplexing set based on a first modulation symbol set and a first reference signal sequence, and determine a second multiplexing set based on a second modulation symbol set and a second reference signal sequence.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

The processing unit 1202 is further configured to obtain a first single-carrier time domain symbol, a second single-carrier time domain symbol, a third single-carrier time domain symbol, and a fourth single-carrier time domain symbol based on the first multiplexing set and the second multiplexing set.

The communication unit 1201 is configured to send the first single-carrier time domain symbol, the second single-carrier time domain symbol, the third single-carrier time domain symbol, and the fourth single-carrier time domain symbol.

Optionally, when obtaining the first single-carrier time domain symbol, the second single-carrier time domain symbol, the third single-carrier time domain symbol, and the fourth single-carrier time domain symbol based on the first multiplexing set and the second multiplexing set, the processing unit 1202 is configured to: perform STBC encoding on the first multiplexing set and the second multiplexing set to obtain a first vector, a second vector, a third vector, and a fourth vector; and obtain the first single-carrier time domain symbol, the second single-carrier time domain symbol, the third single-carrier time domain symbol, and the fourth single-carrier time domain symbol based on the first vector, the second vector, the third vector, and the fourth vector.

Optionally, that a location of the first reference signal sequence in the first multiplexing set is the same as a location of the second reference signal sequence in the second multiplexing set includes:

both an index of the first reference signal sequence in the first multiplexing set and an index of the second reference signal sequence in the second multiplexing set is expressed as:

$$[\langle n_0, n_0+1, \ldots, n_0+M-1\rangle_N], \text{ or } [n_0, n_0+1, \ldots, n_0+M-1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

Optionally, the first vector is represented as s(0), the second vector is represented as −s*(1), the third vector is represented as s(1), and the fourth vector is represented as s*(0); or the first vector is represented as s(0), the second vector is represented as s*(1), the third vector is represented as s(1), and the fourth vector is represented as −s*(0).

s(0) is a frequency-domain representation of the first multiplexing set, s(1) is a frequency-domain representation of the second multiplexing set, "*" represents a conjugate operation, and "−" represents a negative operation.

Optionally, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[\langle n_0, n_0 + 1, ..., n_0 + M - 1\rangle_N], \text{ or } [n_0, n_0 + 1, ..., n_0 + M - 1];$$

and an index of the second reference signal sequence in the second multiplexing set is expressed as:

$$[\langle N - n_0, N - n_0 - 1, ..., N - n_0 - M + 1\rangle_N],$$

$$\text{or } [N - n_0, N - n_0 - 1, ..., N - n_0 - M + 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

Optionally, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

Optionally, the first single-carrier time domain symbol and the second single-carrier time domain symbol are sent on different ports in a first time unit; and the third single-carrier time domain symbol and the fourth single-carrier time domain symbol are sent on different ports in a second time unit. The first time unit is adjacent or not adjacent to the second time unit in time domain.

Optionally, at least one of the first reference signal sequence and the second reference signal sequence includes a cyclic prefix and/or a cyclic suffix. The length of the first multiplexing set is N, and the length of the first reference signal sequence is N/2, N/4, or N/8; and/or the length of the second multiplexing set is N, and the length of the second reference signal sequence is N/2, N/4, or N/8.

In an example, the apparatus 1200 implements corresponding steps performed by the receiving device in the procedure shown in FIG. 3. The apparatus 1200 is a terminal device, or a chip or a circuit configured in the terminal device, or is a network device, or a chip or a circuit configured in the network device. The communication unit 1201 is configured to perform a transceiver-related operation of the receiving device in the foregoing method embodiment, and the processing unit 1202 is configured to perform a processing-related operation of the receiving device in the foregoing method embodiment.

For example, the communication unit 1201 is configured to receive the first single-carrier time domain symbol, the second single-carrier time domain symbol, the third single-carrier time domain symbol, and the fourth single-carrier time domain symbol.

The processing unit 1202 is configured to obtain the first multiplexing set and the second multiplexing set based on the first single-carrier time domain symbol, the second single-carrier time domain symbol, the third single-carrier time domain symbol, and the fourth single-carrier time domain symbol.

The processing unit 1202 is further configured to obtain the first modulation symbol set and/or the first reference signal sequence based on the first multiplexing set, and obtain the second modulation symbol set and/or the second reference signal sequence based on the second multiplexing set.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

Optionally, when obtaining the first multiplexing set and the second multiplexing set based on the first single-carrier time domain symbol, the second single-carrier time domain symbol, the third single-carrier time domain symbol, and the fourth single-carrier time domain symbol, the processing unit is configured to: obtain the first vector, the second vector, the third vector, and the fourth vector based on the first single-carrier time domain symbol, the second single-carrier time domain symbol, the third single-carrier time domain symbol, and the fourth single-carrier time domain symbol; and perform STBC decoding on the first vector, the second vector, the third vector, and the fourth vector, to obtain the first multiplexing set and the second multiplexing set.

Optionally, that a location of the first reference signal sequence in the first multiplexing set is the same as a location of the second reference signal sequence in the second multiplexing set includes: The index of the first reference signal sequence in the first multiplexing set and the index of the second reference signal sequence in the second multiplexing set is represented as:

$$[\langle n_0, n_0 + 1, ..., n_0 + M - 1\rangle_N], \text{ or } [n_0, n_0 + 1, ..., n_0 + M - 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N.

Optionally, the first vector is represented as s(0), the second vector is represented as −s*(1), the third vector is represented as s(1), and the fourth vector is represented as s*(0); or the first vector is represented as s(0), the second vector is represented as s*(1), the third vector is represented as s(1), and the fourth vector is represented as −s*(0).

s(0) is a frequency-domain representation of the first multiplexing set, s(1) is a frequency-domain representation of the second multiplexing set, "*" represents a conjugate operation, and "−" represents a negative operation.

Optionally, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[\langle n_0, n_0 + 1, ..., n_0 + M - 1\rangle_N], \text{ or } [n_0, n_0 + 1, ..., n_0 + M - 1];$$

and an index of the second reference signal sequence in the second multiplexing set is expressed as:

$$[\langle N - n_0, N - n_0 - 1, ..., N - n_0 - M + 1\rangle_N], \text{ or}$$
$$[N - n_0, N - n_0 - 1, ..., N - n_0 - M + 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N.

Optionally, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

Optionally, the first single-carrier time domain symbol and the second single-carrier time domain symbol are received on different ports in a third time unit; and the third single-carrier time domain symbol and the fourth single-carrier time domain symbol are received on different ports in a fourth time unit, where the third time unit is adjacent or not adjacent to the fourth time unit in time domain.

Optionally, at least one of the first reference signal sequence and the second reference signal sequence includes a cyclic prefix and/or a cyclic suffix. The length of the first multiplexing set is N, and the length of the first reference signal sequence is N/2, N/4, or N/8; and/or the length of the second multiplexing set is N, and the length of the second reference signal sequence is N/2, N/4, or N/8.

In this embodiment of this application, division into the units is an example, and is merely logical function division, and is other division during actual implementation. In addition, function units in this embodiment of this application is integrated into one processor, or exists alone physically, or two or more units are integrated into one unit. The integrated unit is implemented in a form of hardware, or is implemented in a form of a software function unit.

A function of the communication unit in the foregoing embodiment is implemented by a transceiver, and a function of the processing unit is implemented by a processor. The transceiver includes a transmitter, a receiver, and/or the like, which are respectively configured to implement functions of the sending unit and/or the receiving unit. The following provides descriptions by using examples and with reference to FIG. 13.

Figure 13:
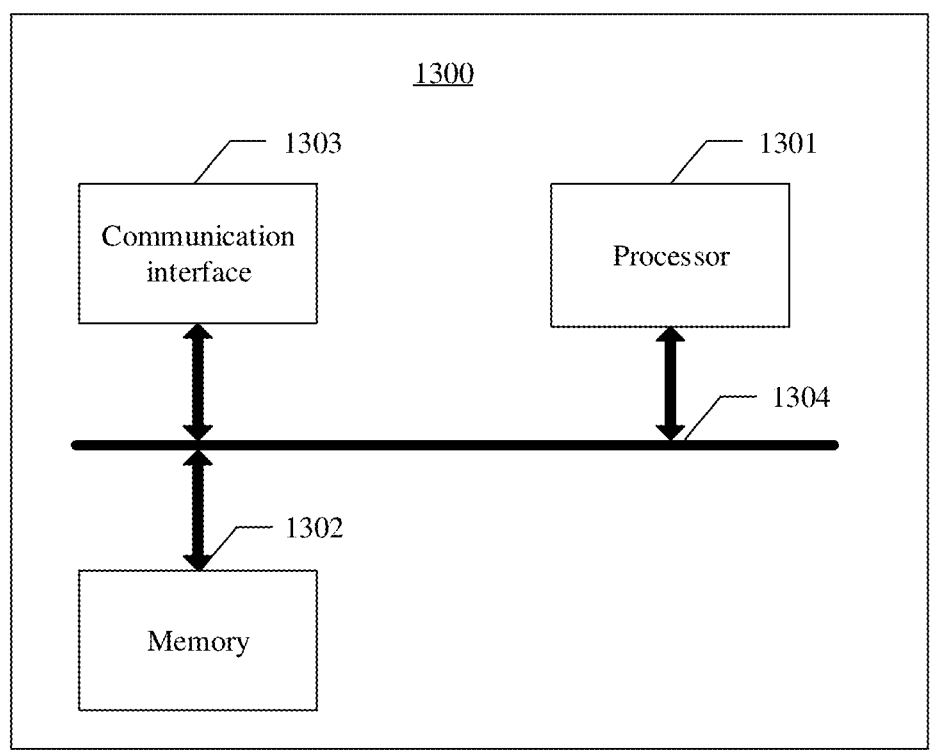
FIG. 13 is a schematic diagram of another structure of an apparatus according to an embodiment of this application.

FIG. 13 is a schematic block diagram of an apparatus 1300 according to an embodiment of this application. The apparatus 1300 shown in FIG. 13 is an implementation of a hardware circuit of the apparatus shown in FIG. 12. The apparatus is applied to the foregoing procedure shown in FIG. 3, and perform functions of a sending device or a receiving device in the foregoing method embodiment. FIG. 13 shows a main part of the apparatus for ease of description.

The apparatus 1300 shown in FIG. 13 includes at least one processor 1301. The apparatus 1300 further includes at least one memory 1302, configured to store program instructions and/or data. The memory 1302 is coupled to the processor 1301. The coupling in this embodiment of this application is an indirect coupling or a communication connection between apparatuses, units, or modules, is in an electrical form, a mechanical form, or another form, and is used for information exchange between the apparatuses, the units, or the modules. The processor 1301 cooperates with the memory 1302, the processor 1301 executes the program instructions stored in the memory 1302, and at least one of the at least one memory 1302 is included in the processor 1301.

The apparatus 1300 further includes a communication interface 1303, configured to communicate with another device by using a transmission medium, so that the apparatus 1300 communicates with the another device. In this embodiment of this application, the communication interface is a transceiver, a circuit, a bus, a module, or a communication interface of another type. In this embodiment of this application, when the communication interface is a transceiver, the transceiver includes an independent receiver and an independent transmitter, or is a transceiver integrated with a transceiver function or an interface circuit.

Embodiments of this disclosure are without limitation to the processor 1301, the memory 1302, and the communication interface 1303 being connected by using a communication bus 1304. The bus is represented by using bold lines in FIG. 13. A connection manner between other components is merely an example for description, and imposes no limitation. The bus includes an address bus, a data bus, a control bus, and the like. For ease of representation, one thick line is used to represent the bus in FIG. 13, but this does not mean that there is one bus or one type of bus.

In an example, the apparatus 1300 is configured to implement steps performed by the sending device in the procedure shown in FIG. 3. The apparatus 1300 is a terminal device, or a chip or a circuit configured in the terminal device. Alternatively, the apparatus 1300 is a network device, or a chip or a circuit configured in the network device. The communication interface 1303 is configured to perform a transceiver-related operation of the sending device in the foregoing method embodiment, and the processor 1301 is configured to perform a processing-related operation of the sending device in the foregoing method embodiment.

The processor 1301 is configured to: determine a first multiplexing set based on a first modulation symbol set and a first reference signal sequence, and determine a second multiplexing set based on a second modulation symbol set and a second reference signal sequence.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of an index of the first reference signal sequence in the first multiplexing set and an index of the second reference signal sequence in the second multiplexing set is equal to N. N is a length of the first multiplexing set, or N is a length of the second multiplexing set, and N is an integer greater than 0.

The processor 1301 is further configured to obtain a first single-carrier time domain symbol, a second single-carrier time domain symbol, a third single-carrier time domain symbol, and a fourth single-carrier time domain symbol based on the first multiplexing set and the second multiplexing set.

The communication interface 1303 is configured to send the first single-carrier time domain symbol, the second single-carrier time domain symbol, the third single-carrier time domain symbol, and the fourth single-carrier time domain symbol.

Optionally, when obtaining the first single-carrier time domain symbol, the second single-carrier time domain symbol, the third single-carrier time domain symbol, and the fourth single-carrier time domain symbol based on the first multiplexing set and the second multiplexing set, the processor 1301 is configured to: perform STBC encoding on the first multiplexing set and the second multiplexing set to obtain a first vector, a second vector, a third vector, and a fourth vector; and obtain the first single-carrier time domain symbol, the second single-carrier time domain symbol, the third single-carrier time domain symbol, and the fourth single-carrier time domain symbol based on the first vector, the second vector, the third vector, and the fourth vector.

Optionally, that a location of the first reference signal sequence in the first multiplexing set is the same as a location of the second reference signal sequence in the second multiplexing set includes:

both an index of the first reference signal sequence in the first multiplexing set and an index of the second reference signal sequence in the second multiplexing set is expressed as:

$$[\langle n_0, n_0 + 1, \ldots, n_0 + M - 1\rangle_N], \text{ or } [n_0, n_0 + 1, \ldots, n_0 + M - 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N.

Optionally, the first vector is represented as s(0), the second vector is represented as −s*(1), the third vector is represented as s(1), and the fourth vector is represented as s*(0); or the first vector is represented as s(0), the second vector is represented as s*(1), the third vector is represented as s(1), and the fourth vector is represented as −s*(0).

s(0) is a frequency-domain representation of the first multiplexing set, s(1) is a frequency-domain representation of the second multiplexing set, "*" represents a conjugate operation, and "−" represents a negative operation.

Optionally, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[\langle n_0, n_0 + 1, \ldots, n_0 + M - 1\rangle_N], \text{ or } [n_0, n_0 + 1, \ldots, n_0 + M - 1];$$

and
an index of the second reference signal sequence in the second multiplexing set is expressed as:

$$[\langle N - n_0, N - n_0 - 1, \ldots, N - n_0 - M + 1\rangle_N], \text{ or }$$
$$[N - n_0, N - n_0 - 1, \ldots, N - n_0 - M + 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle\ \rangle_N$ represents a remainder operation or modulo operation performed on N.

Optionally, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

Optionally, the first single-carrier time domain symbol and the second single-carrier time domain symbol are sent on different ports in a first time unit; and the third single-carrier time domain symbol and the fourth single-carrier time domain symbol are sent on different ports in a second time unit. The first time unit is adjacent or not adjacent to the second time unit in time domain.

Optionally, at least one of the first reference signal sequence and the second reference signal sequence includes a cyclic prefix and/or a cyclic suffix. The length of the first multiplexing set is N, and the length of the first reference signal sequence is N/2, N/4, or N/8; and/or the length of the second multiplexing set is N, and the length of the second reference signal sequence is N/2, N/4, or N/8.

In an example, the apparatus 1300 is configured to implement steps performed by the receiving device in the procedure shown in FIG. 3. The apparatus 1300 is a terminal device, or a chip or a circuit configured in the terminal device. Alternatively, the apparatus 1300 is a network device, or a chip or a circuit configured in the network device. The communication interface 1303 is configured to perform a transceiver-related operation of the receiving device side in the foregoing method embodiment, and the processor 1301 is configured to perform a processing-related operation of the receiving device side in the foregoing method embodiment.

For example, the communication interface 1303 is configured to receive the first single-carrier time domain symbol, the second single-carrier time domain symbol, the third single-carrier time domain symbol, and the fourth single-carrier time domain symbol.

The processor 1301 is configured to obtain the first multiplexing set and the second multiplexing set based on the first single-carrier time domain symbol, the second single-carrier time domain symbol, the third single-carrier time domain symbol, and the fourth single-carrier time domain symbol.

The processor 1301 is further configured to obtain the first modulation symbol set and/or the first reference signal sequence based on the first multiplexing set, and obtain the second modulation symbol set and/or the second reference signal sequence based on the second multiplexing set.

Both the first modulation symbol set and the second modulation symbol set include at least one modulation symbol, and the first reference signal sequence and the second reference signal sequence meet orthogonality or conjugate orthogonality; and a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N. N is a length of the first multiplexing set, or N is a length of the second multiplexing set, and N is an integer greater than 0.

Optionally, when obtaining the first multiplexing set and the second multiplexing set based on the first single-carrier time domain symbol, the second single-carrier time domain symbol, the third single-carrier time domain symbol, and the fourth single-carrier time domain symbol, the processor 1301 is configured to: obtain a first vector, a second vector, a third vector, and a fourth vector based on the first single-carrier time domain symbol, the second single-carrier time domain symbol, the third single-carrier time domain symbol, and the fourth single-carrier time domain symbol; and perform STBC decoding on the first vector, the second vector, the third vector, and the fourth vector, to obtain the first multiplexing set and the second multiplexing set.

Optionally, that a location of the first reference signal sequence in the first multiplexing set is the same as a location of the second reference signal sequence in the second multiplexing set includes:

both an index of the first reference signal sequence in the first multiplexing set and an index of the second reference signal sequence in the second multiplexing set is expressed as:

$$[\langle n_0, n_0 + 1, \ldots, n_0 + M - 1 \rangle_N], \text{ or } [n_0, n_0 + 1, \ldots, n_0 + M - 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

Optionally, the first vector is represented as s(0), the second vector is represented as −s*(1), the third vector is represented as s(1), and the fourth vector is represented as s*(0); or the first vector is represented as s(0), the second vector is represented as s*(1), the third vector is represented as s(1), and the fourth vector is represented as −s*(0).

s(0) is a frequency-domain representation of the first multiplexing set, s(1) is a frequency-domain representation of the second multiplexing set, "*" represents a conjugate operation, and "−" represents a negative operation.

Optionally, that a sum of a start index of the first reference signal sequence in the first multiplexing set and a start index of the second reference signal sequence in the second multiplexing set is equal to N includes:

an index of the first reference signal sequence in the first multiplexing set is expressed as:

$$[\langle n_0, n_0 + 1, \ldots, n_0 + M - 1 \rangle_N], \text{ or } [n_0, n_0 + 1, \ldots, n_0 + M - 1];$$

and an index of the second reference signal sequence in the second multiplexing set is expressed as:

$$[\langle N - n_0, N - n_0 - 1, \ldots, N - n_0 - M + 1 \rangle_N],$$

$$\text{or } [N - n_0, N - n_0 - 1, \ldots, N - n_0 - M + 1].$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

Optionally, the first vector is represented as s(0), the second vector is represented as s(1), the third vector is represented as s*(1), and the fourth vector is represented as −s*(0); or the first vector is represented as s(0), the second vector is represented as s(1), the third vector is represented as −s*(1), and the fourth vector is represented as s*(0).

s(0) is a frequency-domain representation of the first multiplexing set, s(1) is a frequency-domain representation of the second multiplexing set, "*" represents a conjugate operation, and "−" represents a negative operation.

Optionally, the first single-carrier time domain symbol and the second single-carrier time domain symbol are received on different ports in a third time unit; and the third single-carrier time domain symbol and the fourth single-carrier time domain symbol are received on different ports in a fourth time unit, where the third time unit is adjacent or not adjacent to the fourth time unit in time domain.

Optionally, at least one of the first reference signal sequence and the second reference signal sequence includes a cyclic prefix and/or a cyclic suffix. The length of the first multiplexing set is N, and the length of the first reference signal sequence is N/2, N/4, or N/8; and/or the length of the second multiplexing set is N, and the length of the second reference signal sequence is N/2, N/4, or N/8.

An embodiment of this application further provides an apparatus, configured to implement any method in the foregoing method embodiments. An embodiment of this application further provides a computer-readable storage medium, including a program or instructions. When the program or the instructions is/are executed, any method in the foregoing embodiments is performed. An embodiment of this application further provides a chip. The chip is connected to a memory, and is configured to read and execute a computer program or instructions stored in the memory. When the computer program or the instructions is/are executed, any method in the foregoing method embodiments is performed. An embodiment of this application further provides a computer program product. When the computer program product runs on a computer, the computer is enabled to perform the method according to any one of the foregoing aspects. An embodiment of this application further provides a system, including the sending device and/or the receiving device according to any one of the foregoing aspects.

In the embodiments of this application, the processor is a general-purpose processor, a digital signal processor, an application-specific integrated circuit, a field programmable gate array or another programmable logic device, a discrete gate or transistor logic device, or a discrete hardware component, and implements or perform the methods, steps, and logical block diagrams disclosed in the embodiments of this application. The general-purpose processor is a microprocessor, any conventional processor, or the like. The steps in the methods disclosed with reference to the embodiments of this application is directly performed by a hardware processor, or is performed by a combination of hardware and software modules in the processor.

In the embodiments of this application, the memory is a nonvolatile memory, such as a hard disk drive (HDD), a solid-state drive (SSD), or the like, or is a volatile memory, such as a random access memory (RAM). The memory is any other medium that is used to carry or store expected program code in a form of an instruction or a data structure and that is accessed by a computer, but is not limited thereto. The memory in the embodiments of this application alternatively is a circuit or any other apparatus that implements a storage function, and is configured to store program instructions and/or data.

All or a part of the methods in the embodiments of this application is implemented by using software, hardware, firmware, or any combination thereof. When software is used to implement the embodiments, all or some of the embodiments are implemented in a form of a computer program product. The computer program product includes one or more computer instructions. When the computer program instructions are loaded and executed on a computer, the procedures or the functions according to the embodiments of the present disclosure are all or partially generated. The computer is a general-purpose computer, a dedicated computer, a computer network, a network device, user equipment, or another programmable apparatus. The computer instructions are stored in a computer-readable storage medium or is transmitted from one computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, for example, a server or a data center, integrating one or more usable media. The usable medium is a magnetic medium (for example, a floppy disk, a hard disk drive, or a magnetic tape), an optical medium (for example, a digital video disc (DVD)), a semiconductor medium (for example, an SSD), or the like.

A person skilled in the art is able to make various modifications and variations to this application without departing from the scope of this application. This application is intended to cover these modifications and variations of this application provided that the modifications and variations of this application fall within the scope of protection according to the following claims and the claims equivalent technologies.

What is claimed is:

1. A reference signal sequence mapping method, comprising:
    determining, by a sending device, a first multiplexing set based on a first modulation symbol set and a first reference signal sequence;
    mapping the first reference signal sequence to the first multiplexing set;
    determining, by the sending device, a second multiplexing set based on a second modulation symbol set and a second reference signal sequence;
    mapping the second reference signal sequence to the second multiplexing set, wherein:
        both the first modulation symbol set and the second modulation symbol set include at least one modulation symbol, and the first reference signal sequence and the second reference signal sequence meet orthogonally or conjugate orthogonally; and
        a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N, wherein:
            N is an integer greater than 0; and
            N is a length of the first multiplexing set, or
            N is a length of the second multiplexing set; and
    obtaining, by the sending device, a first single-carrier time domain symbol, a second single-carrier time domain symbol, a third single-carrier time domain symbol, and a fourth single-carrier time domain symbol based on the first multiplexing set and the second multiplexing set; and
    sending the first single-carrier time domain symbol, the second single-carrier time domain symbol, the third single-carrier time domain symbol, and the fourth single-carrier time domain symbol.

2. The method according to claim 1, wherein the obtaining, by the sending device, the first single-carrier time domain symbol, the second single-carrier time domain symbol, the third single-carrier time domain symbol, and the fourth single-carrier time domain symbol based on the first multiplexing set and the second multiplexing set comprises:
    performing, by the sending device, space-time block code (STBC) encoding on the first multiplexing set and the second multiplexing set, to obtain a first vector, a second vector, a third vector, and a fourth vector; and
    obtaining, by the sending device, the first single-carrier time domain symbol, the second single-carrier time domain symbol, the third single-carrier time domain symbol, and the fourth single-carrier time domain symbol based on the first vector, the second vector, the third vector, and the fourth vector.

3. The method according to claim 1, wherein the location of the first reference signal sequence in the first multiplexing set is the same as the location of the second reference signal sequence in the second multiplexing set comprises:
both an index of the first reference signal sequence in the first multiplexing set and an index of the second reference signal sequence in the second multiplexing set is expressed as:

$$[n_0, n_0 + 1, \ldots, n_0 + M - 1], \text{ or } [\langle n_0, n_0 + 1, \ldots, n_0 + M - 1 \rangle_N],$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

4. The method according to claim 2, wherein
the first vector is represented as s(0), the second vector is represented as −s*(1), the third vector is represented as s(1), and the fourth vector is represented as s*(0); or
the first vector is represented as s(0), the second vector is represented as s*(1), the third vector is represented as s(1), and the fourth vector is represented as −s*(0), wherein:
s(0) is a frequency-domain representation of the first multiplexing set, s(1) is a frequency-domain representation of the second multiplexing set, * represents a conjugate operation, and − represents a negative operation.

5. The method according to claim 1, wherein the sum of the start index of the first reference signal sequence in the first multiplexing set and the start index of the second reference signal sequence in the second multiplexing set is equal to N comprises:
an index of the first reference signal sequence in the first multiplexing set is expressed as:

$$[\langle n_0, n_0 + 1, \ldots, n_0 + M - 1 \rangle_N], \text{ or } [n_0, n_0 + 1, \ldots, n_0 + M - 1];$$

an index of the second reference signal sequence in the second multiplexing set is expressed as:

$$[\langle N - n_0, N - n_0 - 1, \ldots, N - n_0 - M + 1 \rangle_N],$$
$$\text{or } [N - n_0, N - n_0 - 1, \ldots, N - n_0 - M + 1], \text{ wherein:}$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \ \rangle_N$ represents a remainder operation or modulo operation performed on N.

6. The method according to claim 2, wherein
the first vector is represented as s(0), the second vector is represented as s(1), the third vector is represented as s*(1), and the fourth vector is represented as −s*(0); or
the first vector is represented as s(0), the second vector is represented as s(1), the third vector is represented as −s*(1), and the fourth vector is represented as s*(0), wherein:

s(0) is a frequency-domain representation of the first multiplexing set, s(1) is a frequency-domain representation of the second multiplexing set, * represents a conjugate operation, and − represents a negative operation.

7. The method according to claim 1, wherein:
the first single-carrier time domain symbol and the second single-carrier time domain symbol are sent on different ports in a first time unit; and
the third single-carrier time domain symbol and the fourth single-carrier time domain symbol are sent on different ports in a second time unit, wherein:
the first time unit is adjacent or not adjacent to the second time unit in time domain.

8. The method according to claim 1, wherein:
at least one of the first reference signal sequence and the second reference signal sequence includes a cyclic prefix or a cyclic suffix.

9. The method according to claim 1, wherein:
the length of the first multiplexing set is N, and the length of the first reference signal sequence is N/2, N/4, or N/8; and/or the length of the second multiplexing set is N, and the length of the second reference signal sequence is N/2, N/4, or N/8.

10. A reference signal sequence de-mapping method, comprising:
receiving, by a receiving device, a first single-carrier time domain symbol, a second single-carrier time domain symbol, a third single-carrier time domain symbol, and a fourth single-carrier time domain symbol;
obtaining, by the receiving device, a first multiplexing set and a second multiplexing set based on the first single-carrier time domain symbol, the second single-carrier time domain symbol, the third single-carrier time domain symbol, and the fourth single-carrier time domain symbol;
obtaining, by the receiving device, a first modulation symbol set and/or a first reference signal sequence based on de-mapping the first multiplexing set; and
obtaining, by the receiving device, a second modulation symbol set or a second reference signal sequence based on de-mapping the second multiplexing set, wherein:
both the first modulation symbol set and the second modulation symbol set include at least one modulation symbol, and the first reference signal sequence and the second reference signal sequence meet orthogonally; and
a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N, wherein:
N is an integer greater than 0; and
N is a length of the first multiplexing set; or
N is a length of the second multiplexing set.

11. The method according to claim 10, wherein the obtaining, by the receiving device, the first multiplexing set and the second multiplexing set based on the first single-carrier time domain symbol, the second single-carrier time domain symbol, the third single-carrier time domain symbol, and the fourth single-carrier time domain symbol comprises:
obtaining, by the receiving device, a first vector, a second vector, a third vector, and a fourth vector based on the first single-carrier time domain symbol, the second single-carrier time domain symbol, the third single-carrier time domain symbol, and the fourth single-carrier time domain symbol; and performing, by the receiving device, STBC decoding on the first vector, the second vector, the third vector, and the fourth vector, to obtain the first multiplexing set and the second multiplexing set.

12. The method according to claim 10, wherein the location of the first reference signal sequence in the first multiplexing set is the same as the location of the second reference signal sequence in the second multiplexing set comprises:

both an index of the first reference signal sequence in the first multiplexing set and an index of the second reference signal sequence in the second multiplexing set is expressed as:

$$[\langle n_0, n_0 + 1, \ldots, n_0 + M - 1 \rangle_N], \text{ or } [n_0, n_0 + 1, \ldots, n_0 + M - 1],$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \cdot \rangle_N$ represents a remainder operation or modulo operation performed on N.

13. The method according to claim 11, wherein:
the first vector is represented as s(0), the second vector is represented as $-s^*(1)$, the third vector is represented as s(1), and the fourth vector is represented as $s^*(0)$; or
the first vector is represented as s(0), the second vector is represented as $s^*(1)$, the third vector is represented as s(1), and the fourth vector is represented as $-s^*(0)$, wherein:
s(0) is a frequency-domain representation of the first multiplexing set, s(1) is a frequency-domain representation of the second multiplexing set, * represents a conjugate operation, and − represents a negative operation.

14. The method according to claim 10, wherein the sum of the start index of the first reference signal sequence in the first multiplexing set and the start index of the second reference signal sequence in the second multiplexing set is equal to N comprises:

an index of the first reference signal sequence in the first multiplexing set is expressed as:

$$[n_0, n_0 + 1, \ldots, n_0 + M - 1], \text{ or } [\langle n_0, n_0 + 1, \ldots, n_0 + M - 1 \rangle_N];$$

and an index of the second reference signal sequence in the second multiplexing set is expressed as:

$$[\langle N - n_0, N - n_0 - 1, \ldots, N - n_0 - M + 1 \rangle_N], \text{ or}$$

$$[N - n_0, N - n_0 - 1, \ldots, N - n_0 - M + 1], \text{ wherein:}$$

$n_0$ represents a start location of the first reference signal sequence in the first multiplexing set or a start location of the second reference signal sequence in the second multiplexing set, M represents a length of the first reference signal sequence or a length of the second reference signal sequence; and $\langle \cdot \rangle_N$ represents a remainder operation or modulo operation performed on N.

15. The method according to claim 11, wherein:
the first vector is represented as s(0), the second vector is represented as s(1), the third vector is represented as $s^*(1)$, and the fourth vector is represented as $-s^*(0)$; or
the first vector is represented as s(0), the second vector is represented as s(1), the third vector is represented as $-s^*(1)$, and the fourth vector is represented as $s^*(0)$, wherein:
s(0) is a frequency-domain representation of the first multiplexing set, s(1) is a frequency-domain representation of the second multiplexing set, * represents a conjugate operation, and − represents a negative operation.

16. The method according to claim 10, wherein:
the first single-carrier time domain symbol and the second single-carrier time domain symbol are received on different ports in a third time unit; and
the third single-carrier time domain symbol and the fourth single-carrier time domain symbol are received on different ports in a fourth time unit, wherein:
the third time unit is adjacent or not adjacent to the fourth time unit in time domain.

17. The method according to claim 10, wherein:
at least one of the first reference signal sequence and the second reference signal sequence includes a cyclic prefix and/or a cyclic suffix.

18. The method according to claim 10, wherein:
the length of the first multiplexing set is N, and the length of the first reference signal sequence is N/2, N/4, or N/8; and/or the length of the second multiplexing set is N, and the length of the second reference signal sequence is N/2, N/4, or N/8.

19. An apparatus for providing reference signal sequence mapping and de-mapping, the apparatus comprising:
a processor executes instructions to determine a first multiplexing set based on a first modulation symbol set and a first reference signal sequence, and determine a second multiplexing set based on a second modulation symbol set and a second reference signal sequence, wherein:
both the first modulation symbol set and the second modulation symbol set include at least one modulation symbol, and the first reference signal sequence and the second reference signal sequence conjugate orthogonally; and
a location of the first reference signal sequence in the first multiplexing set is the same as a location of the second reference signal sequence in the second multiplexing set, or a sum of a start index of the first reference signal sequence in the first multiplexing set and a start index of the second reference signal sequence in the second multiplexing set is equal to N, wherein:
N is an integer greater than 0; and
N is a length of the first multiplexing set; or
N is a length of the second multiplexing set, and
the processor further executes instructions to obtain a first single-carrier time domain symbol, a second single-carrier time domain symbol, a third single-carrier time domain symbol, and a fourth single-carrier time domain symbol based on the first multiplexing set and the second multiplexing set; and a transceiver, configured to send the first single-carrier time domain symbol, the second single-carrier time domain symbol, the third single-carrier time domain symbol, and the fourth single-carrier time domain symbol.

20. The apparatus according to claim 19, wherein:
in response to obtaining the first single-carrier time domain symbol, the second single-carrier time domain symbol, the third single-carrier time domain symbol, and the fourth single-carrier time domain symbol based on the first multiplexing set and the second multiplexing set, the processor executes instructions to:
perform STBC encoding on the first multiplexing set and the second multiplexing set, to obtain a first vector, a second vector, a third vector, and a fourth vector; and
obtain the first single-carrier time domain symbol, the second single-carrier time domain symbol, the third single-carrier time domain symbol, and the fourth single-carrier time domain symbol based on the first vector, the second vector, the third vector, and the fourth vector.

* * * * *